(12) United States Patent
Leysieffer et al.

(10) Patent No.: US 7,232,625 B2
(45) Date of Patent: Jun. 19, 2007

(54) SECONDARY ELECTROCHEMICAL CELL

(75) Inventors: Hans Leysieffer, Taufkirchen (DE); Dirk A. Fiedler, Ismaning (DE); Dieter Muller, Meitingen (DE)

(73) Assignee: Cochlear Limited, Lane Cove, NSW (AU)

( * ) Notice: Subject to any disclaimer, the term of this patent is extended or adjusted under 35 U.S.C. 154(b) by 459 days.

(21) Appl. No.: 10/101,193

(22) Filed: Mar. 20, 2002

(65) Prior Publication Data

US 2002/0098410 A1 Jul. 25, 2002

Related U.S. Application Data

(63) Continuation of application No. 09/627,449, filed on Jul. 27, 2000, now abandoned.

(30) Foreign Application Priority Data

Jul. 30, 1999 (DE) .................. 199 36 063

(51) Int. Cl.
*H01M 10/48* (2006.01)
*H01M 2/08* (2006.01)
(52) U.S. Cl. .................. 429/61; 429/7; 429/90
(58) Field of Classification Search .................. 429/61, 429/7, 90
See application file for complete search history.

(56) References Cited

U.S. PATENT DOCUMENTS

| 2,651,669 A | 9/1953 | Neumann |
| 4,082,097 A | 4/1978 | Mann et al. |
| 4,275,739 A | 6/1981 | Fischell |
| 4,756,983 A | 7/1988 | Tucholski |
| 4,871,553 A | 10/1989 | Huhndorff |
| 4,937,153 A | 6/1990 | Huhndorff |
| 4,943,497 A | 7/1990 | Oishi et al. |
| 5,279,292 A | 1/1994 | Baumann et al. |
| 5,358,539 A | 10/1994 | Dawson et al. |
| 5,411,537 A | 5/1995 | Munshi et al. |
| 5,418,082 A | 5/1995 | Taki et al. |
| 5,585,207 A | 12/1996 | Wakabe et al. |
| 5,766,790 A | 6/1998 | Kameishi et al. |
| 6,143,440 A | 11/2000 | Volz et al. |
| 6,269,266 B1 | 7/2001 | Leysieffer |

(Continued)

FOREIGN PATENT DOCUMENTS

DE 41 15 267 11/1992

(Continued)

*Primary Examiner*—John S. Maples
(74) *Attorney, Agent, or Firm*—Jagtiani + Guttag

(57) ABSTRACT

A secondary electrochemical cell with at least one positive electrode includes an active material and one negative electrode, which are held directly in a hermetically tight housing which has at least one detector element or which is dynamically connected to one such detector element. The detector element is designed or can be set to acquire a predetermined unallowable operating state of the secondary electrochemical cell, and in an unallowable operating state of the secondary electrochemical cell, to actuate at least one switching element which prevents recharging and/or discharging of the secondary electrochemical cell. By making the housing as a hermetically tight protective housing, which is part of an implantable medical device, contamination of surrounding tissue with toxic substances and hazard to the implant wearer by the malfunction of the secondary electrochemical cell can be precluded under all operating conditions with simultaneously great reduction of all dimensions.

31 Claims, 10 Drawing Sheets

U.S. PATENT DOCUMENTS 6,287,718 B1 * 9/2001 Azema ..................... 429/61
6,296,965 B1 * 10/2001 Azema ..................... 429/61

FOREIGN PATENT DOCUMENTS

| DE | 198 37 912 | 10/1999 |
|----|------------|---------|
| EP | 0 470 726  | 2/1992  |
| EP | 0 801 958  | 10/1997 |
| EP | 0 981 173  | 2/2000  |
| EP | 0 981 262  | 2/2000  |
| EP | 0 982 784  | 3/2000  |
| GB | 2 305 292  | 4/1997  |
| JP | 10-214612  | 8/1998  |

* cited by examiner

SECONDARY ELECTROCHEMICAL CELL

CROSS-REFERENCE TO RELATED APPLICATION

This application is a continuation of U.S. patent application Ser. No. 09/627,449, filed Jul. 27, 2000, now abandoned.

BACKGROUND OF THE INVENTION

1. Field of the Invention

The invention relates to an secondary electrochemical cell with at least one positive electrode which comprises an active material and one negative electrode, which are held directly in a housing which has at least one detector element or which is dynamically connected to one such detector element. The latter being designed or can be set to acquire a predetermined unallowable operating state of the secondary electrochemical cell and in an unallowable operating state of the secondary electrochemical cell to actuate at least one switching element which prevents recharging and/or discharging of the secondary electrochemical cell.

2. Description of the Related Art

In secondary electrochemical cells a pressure rise in the interior of the housing of the secondary electrochemical cell can occur, for example, upon excess charging or discharging with an unallowably high current and it leads to deformation of the housing which can become so large that chemicals, especially in gaseous or liquid form, emerge from the housing in large amounts. Various protective mechanisms have been proposed to increase the operating safety of secondary electrochemical cells.

Thus, publication EP-A-0 470 726 discloses a secondary electrochemical cell which has a cylindrical housing with a pressure membrane as the detector element. The housing directly accommodates the electrodes of the secondary electrochemical cell, the pressure membrane as part of the housing being integrated on the face side in the housing and bulging when the pressure rises in the interior of the housing, so that a plate-shaped switching element which is centrally connected to the pressure membrane reversibly or irreversibly interrupts the electrical contact between the electrode and a terminal contact which is provided on the outside of the housing as soon as the pressure within the housing reaches a predetermined value.

EP-A-0 322 112, EP-A-0 360 395 and EP-A-0 370 634 disclose providing electrochemical cells with a switching element which, when a certain still tolerable boundary deformation of the housing is exceeded, preferably irreversibly separates an electrical terminal contact from a pertinent electrochemically active electrode in order to prevent further deformation of the housing. The housing directly accommodates the electrodes and surrounds an electrically conductive cylindrical housing section which is closed on the face side and which makes contact with an electrode, on the end face the plate-shaped switching element being attached centrally by means of an electrically insulating cement from the outside. The electrically, likewise, conductive switching element in its base position, via its outside edge, forms an electrical connection between the housing section and the electrical terminal contact which projects to the outside and which is located in the center of the switching element. When the pressure rises within the housing the face side of the housing section acting as the detector element bulges to the outside, by which the contact between the housing section and the outside edge of the switching element and, thus, between the one electrode and the terminal contact is interrupted. One typical application of these switching elements is standard D cells. The bulging of the face side, starting from which the switching element interrupts electrical contact, in this case is 0.76 mm to 1.8 mm. For bulging of more than 1.8 mm emergence of chemicals from within the housing can ordinarily be expected.

EP-A-0 674 351 discloses a secondary electrochemical cell with a housing which comprises a cutting device which can be actuated by a pressure membrane and which, when a boundary pressure is exceeded within the housing, irreversibly, severs an electrical conductor which connects the terminal contact of the secondary electrochemical cell to an electrochemically active electrode.

Also, when using a switching element which interrupts the electrical connection between the terminal contact and the pertinent electrochemically active electrode when a certain pressure within the housing is exceeded, it is possible for the pressure to continue to rise and ultimately for chemicals to emerge from the housing of the electrochemical cell or for the latter even to explode. For this reason, for example in EP-A-0 364 995, EP-A-0 573 998 or EP-A-0 739 047 it is proposed that a pressure membrane which actuates the switching element and which is integrated into the housing be provided with a bursting area via which after activation of the switching element and a further pressure rise chemicals can emerge from the interior of the housing.

SUMMARY OF THE INVENTION

The mechanisms cited in the aforementioned prior art for increasing the operating safety of secondary electrochemical cells are not suited for those cells which are used as part of implantable medical devices, since especially high demands must be met for this purpose, especially with regard to safety and reliability, with a simultaneously very extensive reduction of all dimensions. Thus, for example, contamination of surrounding tissue with toxic substances and hazard to the implant wearer by the malfunction of the secondary electrochemical cell must be precluded under all operating conditions. In electrochemical cells with a structure according to the described prior art this cannot be done since it happens that especially toxic gases emerge in intolerably large amounts from the housing of the electrochemical cells even during proper, normal operation of the electrochemical cell.

U.S. Pat. No. 6,143,440 a protective device for a repeatedly rechargeable electrochemical battery with a battery housing is disclosed, the protective device having at least one switching element which can be actuated by a detector element and which is designed or can be set to prevent recharging and/or discharging of the battery in a predetermined unallowable operating state thereof. Here the protective device comprises a hermetically tight protective housing which holds the battery housing, impresses on the detector element a change of shape in an unallowable operating state of the battery, and is part of an implantable device. Especially in a predetermined unallowably large expansion in the volume of the battery housing or emergence of gas from the interior of the battery housing which leads to an unallowably large pressure rise in the interior of the protective housing, a change of shape is impressed on the detector element by the protective housing, which change actuates the switching element. The latter can be made as a make contact which electrically short circuits a recharging circuit which can be supplied by means of a charging device.

The invention is a secondary electrochemical cell which meets the specific requirements for parts of implantable medical devices, and at the same time the construction effort is to be minimized.

The invention is a secondary electrochemical cell with the housing being made as a hermetically tight protective housing which is part of an implantable medical device.

All chemical substances of the secondary electrochemical cell are securely retained in the protective housing by the housing which directly accommodates at least one positive and at least one negative electrode of the secondary electrochemical cell being made as a hermetically tight protective housing.

Here hermetic tightness is preferably defined as hermetic gas tightness as per Mil-Std 883 D. This ensures that when using the secondary electrochemical cell in an electronic implant which is itself in turn accommodated in a hermetically tight and furthermore biocompatible housing, besides liquid toxic substances, no gases can emerge from the protective housing of the secondary electrochemical cell either. The hermetic gas tightness of the protective housing reliably prevents danger to the surrounding electronics. This means that the electronic circuits, especially integrated circuits, can remain unprotected since contamination even by extremely small amounts of emerging gases is not possible. If the secondary electrochemical cell is not accommodated in the housing of an electronic implant, but is implanted directly in its protective housing, the hermetic gas tightness as per Mil-Std 883 D precludes corresponding contamination of the surrounding tissue. In this case, at least the outside of the protective housing as a whole is furthermore made biocompatible.

The concept of direct accommodation of at least one positive electrode which comprises an active material and a negative electrode in the housing of the secondary electrochemical cell which has been made as a protective housing is defined here in that between the hermetically tight protective housing and the electrodes there is no further housing which holds the electrodes, especially no housing which is used essentially to accommodate mechanical loads such as for example to accommodate compressive forces by gas evolution or the like of the secondary electrochemical cell and/or which has an electrically conductive housing section with an inside which makes contact with an electrode. This does not preclude electrical insulation or the like between at least one electrode and the protective housing, or electrical insulation and/or flexibly soft jacketing surrounding the electrodes. Furthermore, in the protective housing there can be mechanical internals and/or it can be divided into several interior volumes, and one interior volume throughout can directly accommodate only one of the electrodes.

It goes without saying that the protective housing, besides the electrodes, accommodates other components of the secondary electrochemical cell which are necessary for the sequence of electrochemical reactions on the electrodes. This applies especially to an electrolyte and optionally to a separator (diaphragm), which latter can be omitted when its function as an electrical insulator which allows ion migration is assumed by the electrolyte, as is the case for example in polymer electrolytes.

This invention is not limited to certain electrodes/electrolyte systems, but rather fundamentally any common systems can be used. Examples include the following: nickel-cadmium systems (sinter electrodes: ground electrodes; liquid, pasty or solid electrolyte systems; separator); nickel-metal hydride systems (sinter electrodes: ground electrodes; liquid, pasty or solid electrolyte systems; separator); lithium-based systems ((a) lithium metal or alloy anode, inorganic or organic dispersion or redox or other cathode; liquid, gel, pasty or solid electrolyte systems; optionally separator; or (b): lithium intercalation anode, inorganic or organic dispersion or redox or other cathode; liquid, gel, pasty or solid electrolyte system; optionally separator); nickel-iron systems; nickel-zinc systems; zinc-silver oxide systems; cadmium-silver oxide systems; zinc-manganese dioxide systems; redox systems such as, for example, quinone/hydroquinone systems; or zinc-mercury oxide systems and silver-metal hydride systems.

Within the framework of this invention, more than only one positive and one negative electrode can also be used, the electrodes being accommodated directly by the protective housing and in the conventional manner they can be series-connected or arranged in bipolar configuration for voltage multiplication or can be connected in parallel for capacitance multiplication. A combination of these types of connection is likewise possible.

In the implantable medical device among others it can be an active electronic hearing implant, a cardiac pacemaker, a drug dispenser, a neurostimulator or the like.

Recharging of the secondary electrochemical cell is preferably prevented by making at least one switching element as a break contact which is designed or which can be set to electrically interrupt a recharging circuit which can be supplied by means of a charging device in an unallowable operating state of the secondary electrochemical cell.

At least one switching element can furthermore be made as a break contact which is designed or which can be set to electrically interrupt a consumer circuit which is connected to the secondary electrochemical cell in an unallowable operating state of the secondary electrochemical cell. Thus, it is possible, for example, to prevent in case of a short circuit in the consumer circuit an overly high electrical power from being withdrawn from the secondary electrochemical cell. This, likewise, can cause an unallowable operating state of the secondary electrochemical cell, for example, in the form of exceeding a stipulated boundary temperature or boundary pressure within the hermetically tight protective housing. It is also conceivable for the break contact to be arranged such that it simultaneously interrupts the recharging circuit with the consumer circuit.

In another preferred embodiment of the invention at least one switching element is made as a make contact which is designed or which can be set to electrically short circuit a recharging circuit which can be supplied by means of a charging device in an unallowable operating state of the secondary electrochemical cell, by which further energy supply to the secondary electrochemical cell is interrupted.

Furthermore, there can be at least one switching element which is made as a make contact which is designed or which can be set to electrically short circuit the secondary electrochemical cell in an unallowable operating state thereof. This make contact is especially feasible in serial coupling to an overcurrent fuse which can irreversibly interrupt a current in a recharging circuit and/or consumer circuit of the secondary electrochemical cell. The overcurrent fuse can be made as a fusible link which is burned through when the residual energy stored in the secondary electrochemical cell is short circuited. If the energy is not sufficient to do this, the secondary electrochemical cell can be completely discharged. It is likewise possible for at least one overcurrent fuse to simply limit the current in the recharging circuit and/or consumer circuit, advantageously the overcurrent fuse being made as a cold conductor (PTC resistor) with a resistor which increases as the temperature increases.

The switching elements can fundamentally, reversibly or irreversibly, interrupt a circuit into which they have been incorporated. Reversibly operating switching elements offer the advantage that their operation can be tested nondestructively, for example in the assembled state in interaction with other components of the secondary electrochemical cell or the implantable medical device.

If the stipulated unallowable operating state of the secondary electrochemical cell is a boundary temperature as the stipulated still allowable temperature being exceeded at a defined position of the secondary electrochemical cell, at least one detector element is designed or can be set to acquire the temperature of the secondary electrochemical cell, especially within the protective housing, and when an unallowable temperature is reached to actuate at least one switching element.

Evolution of gas and/or swelling of the electrodes and/or a temperature rise during operation of the secondary electrochemical cell can lead to an increase of the pressure within the protective housing. If a boundary temperature as the stipulated still allowable temperature within the protective housing being exceeded is chosen as the criterion for the stipulated unallowable operating state of the secondary electrochemical cell, at least one detector element is designed or can be set to acquire the pressure in the interior of the protective housing which houses at least one electrode and when an unallowable pressure is reached to actuate at least one switching element. If the protective housing, which is hermetically tight to the outside, is divided within into several sections, which are sealed relative to one another without, however, the need to ensure hermetic tightness among one another, the pressure can preferably be acquired in one of the sections. Swelling of the electrodes, which lead to expansion of their volume and the resulting pressure rise within the protective housing, can be acquired via a detector element, also by direct interaction of the detector element with at least one electrode by, preferably, positioning the detector element such that at least one electrode in an unallowable operating state of the secondary electrochemical cell adjoins the detector element, possibly with the interposition of electrical insulation, and impresses on it at least one change of shape which actuates the switching element.

At least one detector element is preferably designed or can be set such that in an unallowable operating state of the secondary electrochemical cell a change in shape is impressed on the element, which change of shape actuates at least one switching element. In doing so, the detector element can be arranged and/or made such that an elastic and/or plastic shape change is impressed on it, depending on the internal pressure and/or the temperature in the protective housing and/or swelling of the electrodes. Feasibly the shape change which is impressed on the detector element in an unallowable operating state of the secondary electrochemical cell mechanically actuates at least one switching element. Direct mechanical actuation of the switching element by the change in shape of the detector element is especially reliable since it works necessarily without being dependent on non-mechanical transmission elements.

This does not preclude the fact that especially when two or more switching elements are redundantly present, at least one switching element can be actuated by means of evaluation electronics which acquire the change in shape of the detector element. Advantageously, an electrical extensometer is used which acquires the change in shape of the detector element and responds with a change in an electrical quantity which is monitored by the evaluation electronics. If the electrical extensometer is a passive system, it can convert the change in shape of the detector element into a change in its electrical resistance (strain gauge), its inductance or its capacitance. Alternatively, an active extensometer can be used which, like a piezo element, reacts with a change in charge to the change in shape which is applied to the extensometer by the detector element.

In another embodiment of the invention at least one detector element is part of the protective housing and is made especially as a bulging membrane which preferably forms the outside or separating wall of the hermetically tight protective housing. At least one detector element can be accommodated within the protective housing. This allows space-saving construction and an easily predictable change in shape of the detector element when the pressure in the protective housing rises.

In particular, the thickness of the protective housing, which is especially critical for an implantable medical device, can be minimized when at least one membrane is integrated into a side wall of the hermetically tight protective housing, the direction of bulging of the membrane running essentially perpendicular to the smallest extension of the protective housing. The cover and bottom of the protective housing which is provided in the direction of the smallest extent of the protective housing above or below the latter then feasibley remain free of detector elements and switching elements so that the thickness of the protective housing exceeds only slightly that of the electrode/electrolyte arrangement. Furthermore, it is possible to arrange at least one detector element outside the section of the protective housing which houses the electrodes and to bring it into fluid connection with the interior of the protective housing such that there is greater freedom in adaptation to the circumstances of the implantation site. Redundant protection against an unallowable operating state of the secondary electrochemical cell arises when, for example, there are two membranes, of which one is made as part of a make contact, and by means of this membrane, in an unallowable operating state of the secondary electrochemical cell one contact pair of the make contact can be electrically short circuited. The second membrane can be made as part of a break contact and, by means of this second membrane, in an unallowable operating state of the secondary electrochemical cell one contact pair of the break contact can be electrically disengaged.

The protective housing under all operating conditions must form a hermetically tight barrier with respect to the space located outside the protective housing. In particular, neither energy supply nor energy removal, nor the energy stored in the secondary electrochemical cell and the chemical processes which take place during operation may lead to destruction of the hermetic tightness. Factors which should be considered, in particular, in the design of the protective housing and the choice of materials are: chemical effects of the electrolyte and electrodes on the protective housing at the storage and operating temperature; electrochemical processes within the protective housing as a result of all conceivably possible charging and discharging processes; mechanical loads of the protective housing as a result of chemical, electrochemical or physical (especially thermal) processes such as gas evolution within the protective housing; swelling of the electrodes; changes in the ambient pressure; heating by energy supply or energy removal; and a change of the storage temperature.

A suitable protective housing can be attained especially as a hermetically tight material interconnection between at least one electrically conductive metallic housing section and at least one electrically insulating inorganic-nonmetallic housing section. The housing sections are preferably welded to one another, but can also be joined to one another hermetically tight by means of a soldering process.

Materials which are especially chemically inert to the electrodes/electrolyte systems ordinarily used and which are resistant to the electrochemical processes which take place include metals and precious metals which form a passivation layer against chemical decomposition. They include among others: platinum, chromium nickel steel, nickel alloys, titanium, tantalum and niobium. Preferably, ceramics which can be materially joined hermetically tight to at least one metallic housing section are used as the inorganic-nonmetallic insulator materials.

In at least one electrically insulating inorganic-nonmetallic housing section at least one single-pole electrically conductive penetration can be accommodated hermetically tight and electrically insulated. In doing so, the insulator material can be used for electrical insulation of the poles of the penetration both among one another and also with regard to adjoining electrically conductive metallic housing sections.

Preferably, at least one pole of the hermetically tight penetration has a metallic contact pin which penetrates, hermetically tightly, the electrically insulating inorganic-nonmetallic housing section. The contact pins are feasibly held in the insulating material, for example in a ceramic substrate, and this for its part in the outside wall of the protective housing hermetically tightly by means of a material connection, preferably a solder connection, especially a gold solder connection. Especially suitable materials for the contact pin can be platinum-iridium alloys.

It can be advantageous for the contact pins to be held hermetically tight by means of a material connection in the electrically insulating inorganic-nonmetallic housing section and the latter in an metallic receiver, the metallic receiver likewise being materially connected to the outside wall of the protective housing. To connect the metallic receiver to the outside wall of the protective housing a weld joint can be used.

The penetration can fundamentally be made with one or more poles. Advantageously, at least one pole of the hermetically tight penetration having made contact with the electrode of the secondary electrochemical cell. But, the hermetically tight penetration enables not only transmission of energy but also, in principle, transmission of signals through one wall of the protective housing. For example, the potential of a potential probe can be routed through the wall of the protective housing by means of one pole of the penetration. The potential probe being located especially in the electrolyte between one positive and one negative electrode of the secondary electrochemical cell, as is described in EP-A-0 981 262 (corresponding to co-assigned U.S. Pat. No. 6,192,272) which has not been published.

The dimensions of the electrically insulating section, which is provided in the protective housing and which is formed preferably by a ceramic material, can be minimized and limited to the section which accommodates the penetration when the number of poles of the penetration corresponds to the number of energy and signal taps, via which the secondary electrochemical cell is connected to other components of the implantable medical device. In this case, the remaining wall of the protective housing can be made in a metallic material with an inside which is electrically insulated with reference to the electrodes.

Also at least one electrically conductive metallic housing section can make contact with an energy or signal tap which is accommodated within the protective housing. In particular, at least one electrically conductive metallic housing section makes electrical contact with one electrode of the secondary electrochemical cell. One especially simple structure of the protective housing arises when the positive and the negative electrode of the secondary electrochemical cell are each connected to an electrically conductive metallic housing section, the two metallic housing sections being electrically insulated against one another, and a penetration can be omitted.

Preferably, the electrodes conventionally have an electrical tap which for its part makes contact either with one pole of the hermetically tight penetration or an electrically conductive metallic housing section from the inside of the protective housing. Contact of the taps on the electrically conductive housing section or on the pole of the penetration can be accomplished preferably directly via weld or solder connections, or indirectly via electron-conductive intermediate elements which adjoin by force-fit, such as for example springs, pins, metal foams or the like.

In another embodiment of the invention, to increase the operating safety and to create redundancy, the protective housing is dimensioned such that its hermetic tightness is preserved even if in an unallowable operating state of the secondary electrochemical cell it can continue to be recharged or discharged. This means that even in a malfunction for example of the detector element and/or the switching element the protective housing up to certain upper boundaries withstands the physical loads which occur when the supply or removal of energy is not interrupted even if the secondary electrochemical cell enters an unallowable state.

If the outside of the protective housing as a whole is made biocompatible, it can be directly implanted and connected to a consumer via electrical lines which are permanently connected or which are detachable. Thus, the implantation site is irrelevant, as is described also in EP-A-0 982 784 (corresponding to co-assigned U.S. Pat. No. 6,269,266) which has not been published. Materials for the biocompatible protective housing can be preferably titanium, titanium alloys, niobium, tantalum, implantable steels or a composite of them or other implantable metallic with ceramic materials such as aluminum oxide ceramics, and jacketing of the entire protective housing with a biocompatible polymer, for example silicone, polytetrafluorethylene (PTFE), polymethane, parylene or the like.

These and further objects, features and advantages of the present invention will become apparent from the following description when taken in connection with the accompanying drawings which, for purposes of illustration only, show several embodiments in accordance with the present invention.

Figure 16:
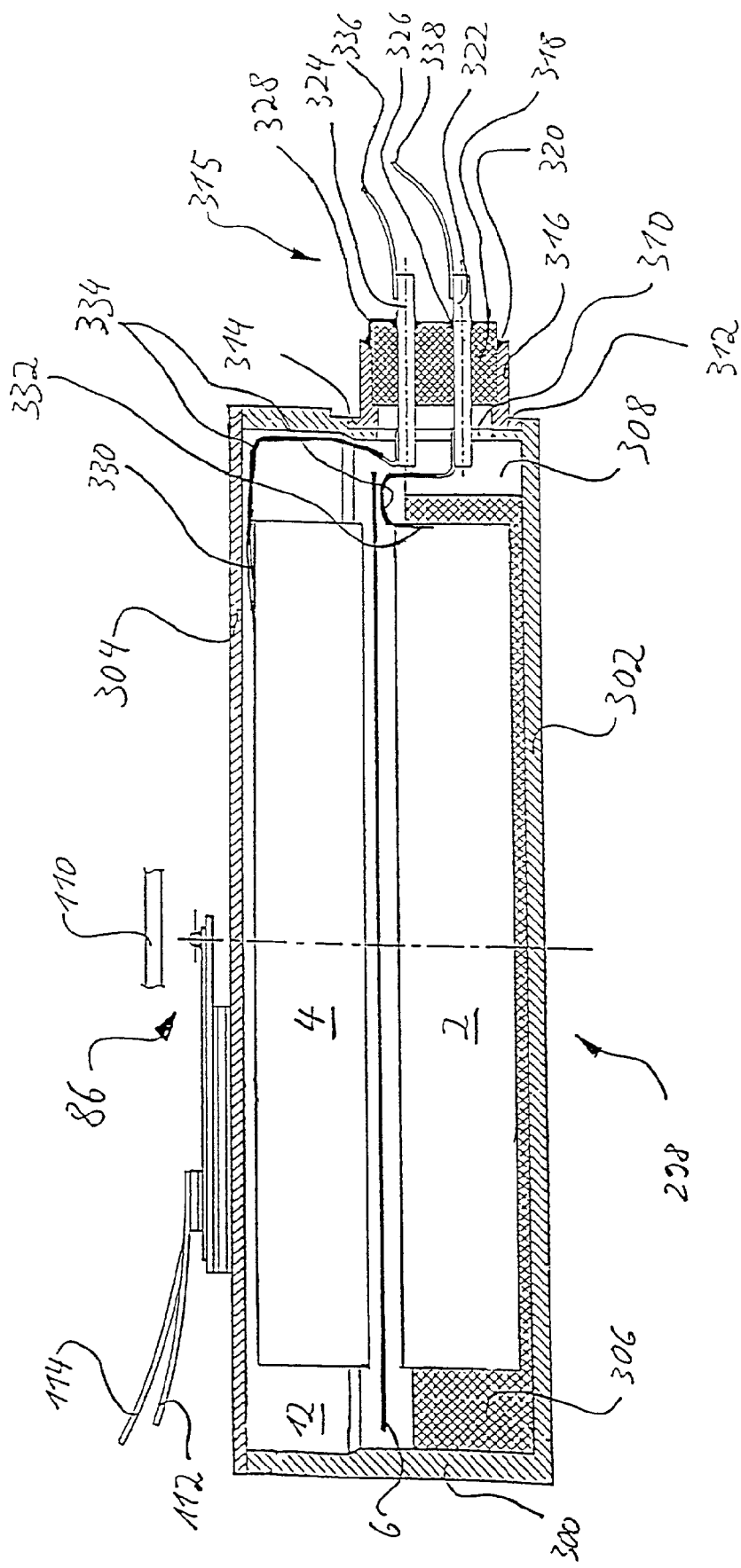
Figure 17:
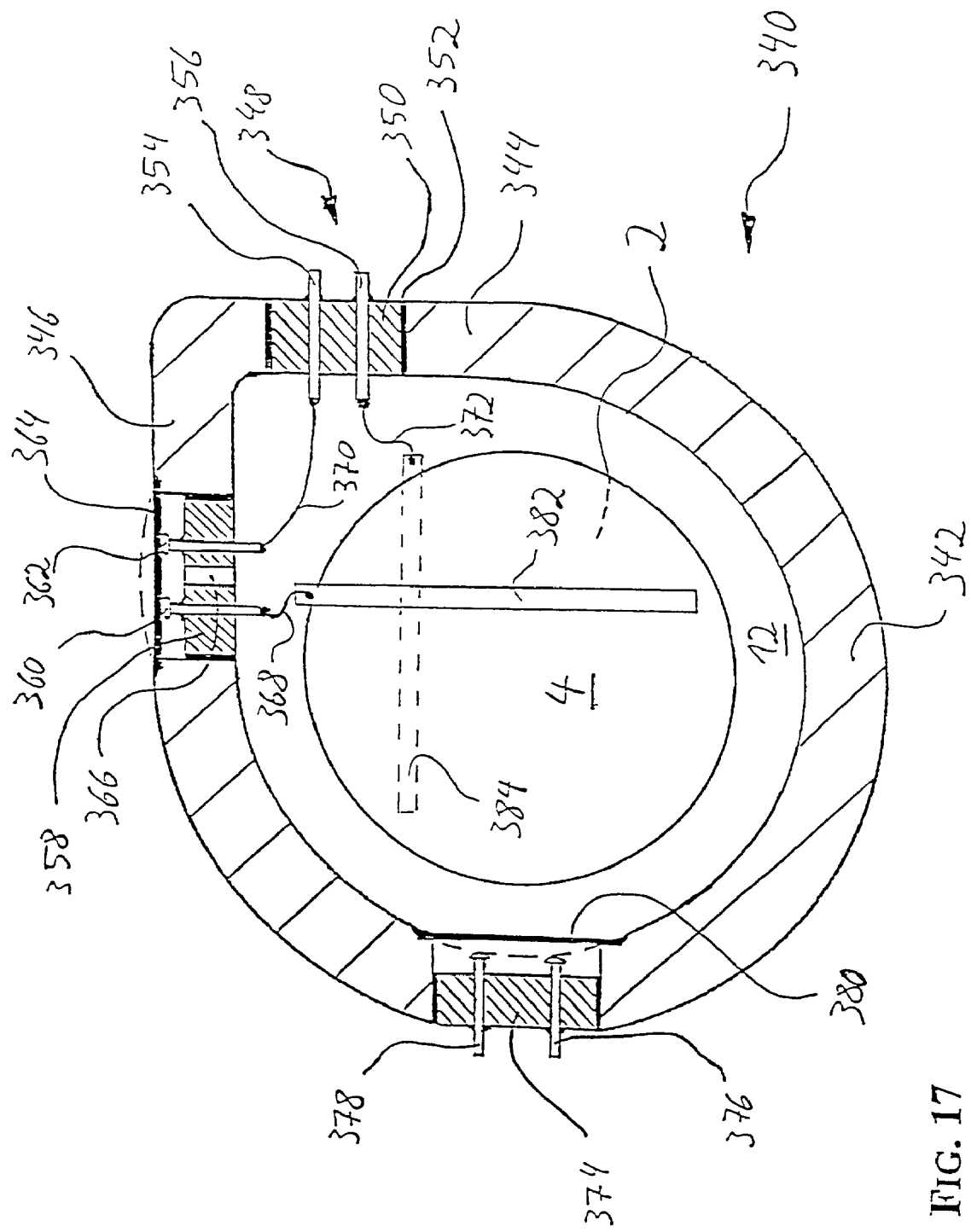

FIG. 16 is a cross-sectional view of a secondary electrochemical cell with a hermetically tight double-pole penetration as a current path to or from one positive and one negative electrode of the secondary electrochemical cell at a time; and FIG. 17 is a cross-sectional view of a secondary electrochemical cell with a doublepole penetration, the penetration and two switching and detector elements at a time being integrated in one side wall of the protective housing.

DETAILED DESCRIPTION OF THE INVENTION

Figure 1:
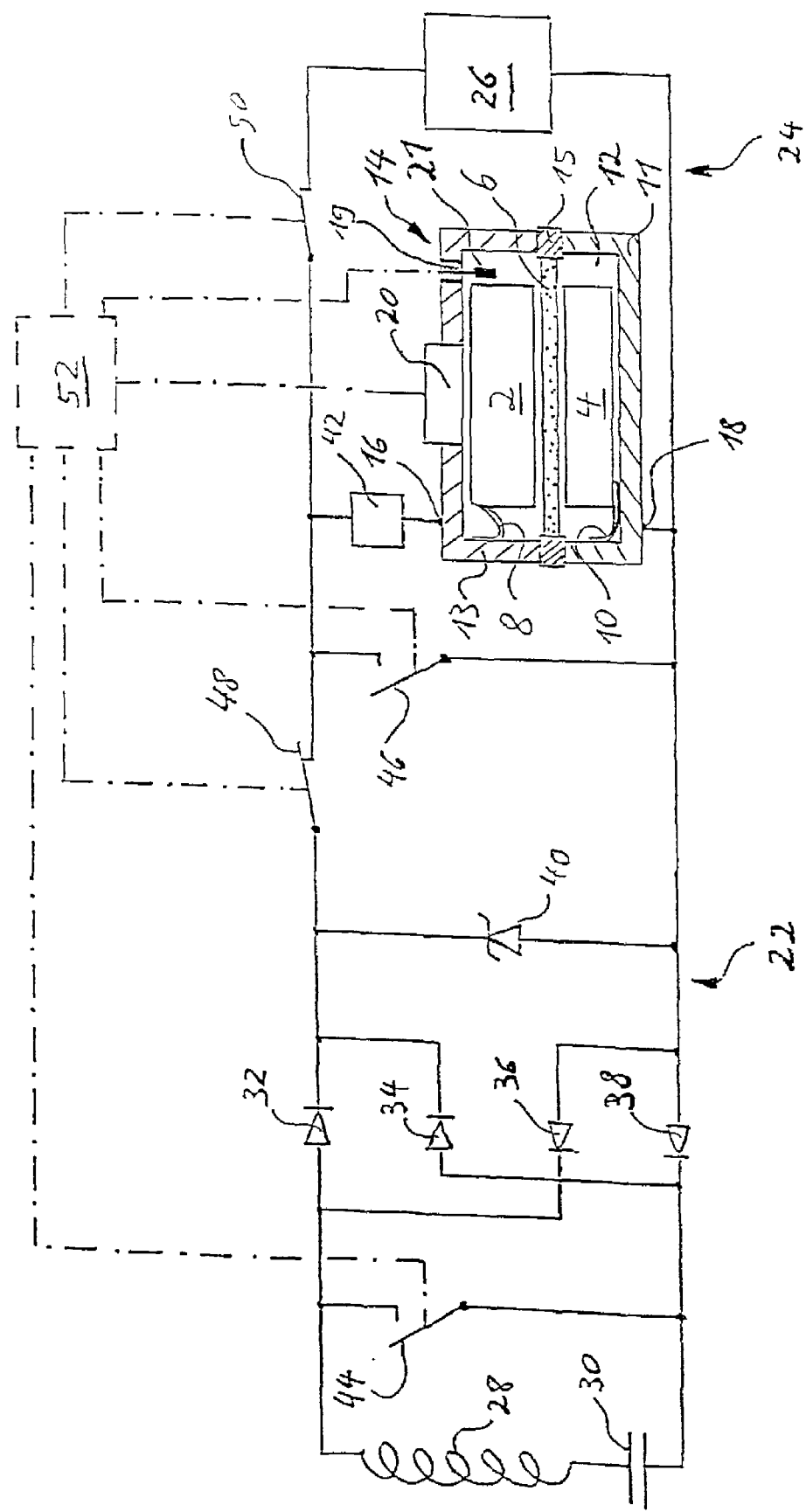
FIG. 1 is a schematic circuit diagram with a secondary electrochemical cell which is incorporated into a consumer circuit and a recharging circuit.

According to FIG. 1, the secondary electrochemical cell as part of an implantable medical device has a protective housing 14 which hermetically tightly accommodates a positive electrode 2, a negative electrode 4, an electrolyte 12 and a separator 6 which is used to prevent an electrical short circuit between the electrodes 2, 4. The separator 6 which is positioned between the two electrodes 2 and 4 is used as an electrical insulator which, however, allows ion migration between the electrodes 2 and 4. The positive electrode 2 and the negative electrode 4 each have one electron-conductive tap 8 and 10, the tap 8 making contact with an electrically conductive housing section 13 and the tap 10 making contact with an electrically conductive housing section 11 of the protective housing 14. The two housing sections 11 and 13 are electrically insulated against one another by means of an inorganic-nonmetallic housing section 15 which is preferably made of ceramic material. Another electrically insulating inorganic-nonmetallic housing section 19 holds an electrically conductive penetration which is used to pass a signal from a detector element 21 which is made as a temperature sensor and which records the temperature of the secondary electrochemical cell at a stipulated site within the protective housing 14 and acquires an unallowable operating state of the secondary electrochemical cell in the form of an unduly high temperature.

The housing sections 11 and 13 on their outsides each have one terminal 18 and 16 via which the negative electrode 4 and the positive electrode 2 are connected to a recharging circuit 22 and a consumer circuit 24. The protective housing 14 is dynamically connected to another detector element 20 such that, in an unallowable operating state of the secondary electrochemical cell in the form of an unduly high internal pressure within the protective housing 14, a change in shape is impressed on the detector element 20. In doing so, gas evolution and/or swelling of the electrodes 2, 4 and/or a temperature rise during operation of the secondary electrochemical cell can cause a pressure rise within the protective housing 14.

The secondary electrochemical cell in the consumer circuit 24 supplies, via a break contact 50, a consumer 26 of the implantable medical device which can be, for example, an implantable active hearing aid. The recharging circuit 22 has a receiver coil 28 which, together with a capacitor 30, forms a serial resonant circuit which is excited by a second serial resonant circuit (not shown) of an external sending part with the same resonance range as is detailed in U.S. Pat. No. 5,279,292. Depending on the phase, the recharging circuit 22 is connected via diodes 32, 38 and 34, 36, a break contact 48, an overcurrent fuse 42 and the electrodes 2, 4 which are accommodated in the protective housing 14. A Zener diode 40 protects the secondary electrochemical cell from overly high voltage of the recharging circuit. Parallel to the receiving coil 28 and the capacitor 30 there is a make contact 44. Another make contact 46 is located parallel to the secondary electrochemical cell and the overcurrent fuse 42.

As shown by the dot-dash line in FIG. 1, the detector elements 20 and 21 actuate the switching elements 44, 46, 48 and 50 which are part of the implantable medical device. This can take place in the detector element 20 either directly, for example by mechanical coupling of the detector element 20 and one or more switching elements, or indirectly via optional evaluation electronics 52 which acquires the change in shape of the detector element 20 and actuates one or more switching elements electrically or electromechanically. The evaluation electronics 52 is, furthermore, used to acquire the signal of the detector element 21 which is made as a temperature sensor and to actuate one or more of the switching elements 44, 46, 48, and 50. It goes without saying that not all switching elements 44, 46, 48, and 50 need be present and that the classification, which of the switching elements are actuated directly or via the optional evaluation electronics 52, can be varied depending on the application and the desired redundancy. It can furthermore be provided that one switching element or several switching elements be actuated only when the two detector elements 20 and 21 signal an unallowable operating state of the secondary electrochemical cell.

The position of the switching elements 44, 46, 48 and 50 which is shown in FIG. 1 corresponds to a base position in normal operation. In the case of an unallowable operating state of the secondary electrochemical cell at least one of these switching elements is actuated.

Figure 2:
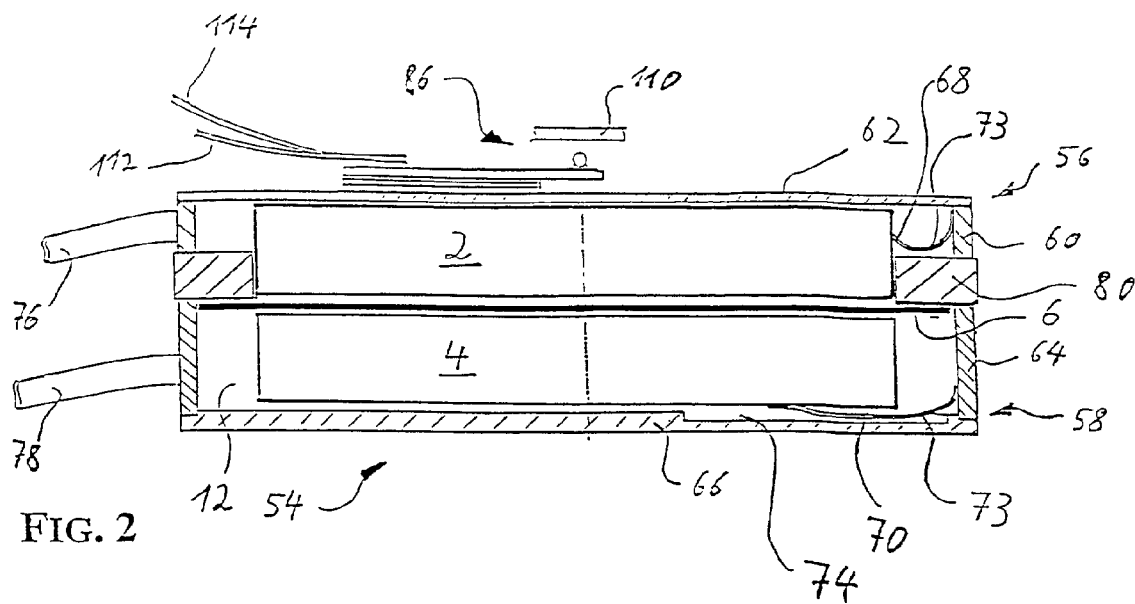
FIG. 2 is a cross-sectional view of a first embodiment of a secondary electrochemical cell with a hermetically tight protective housing and a reversibly operating switching element.
Figure 3:
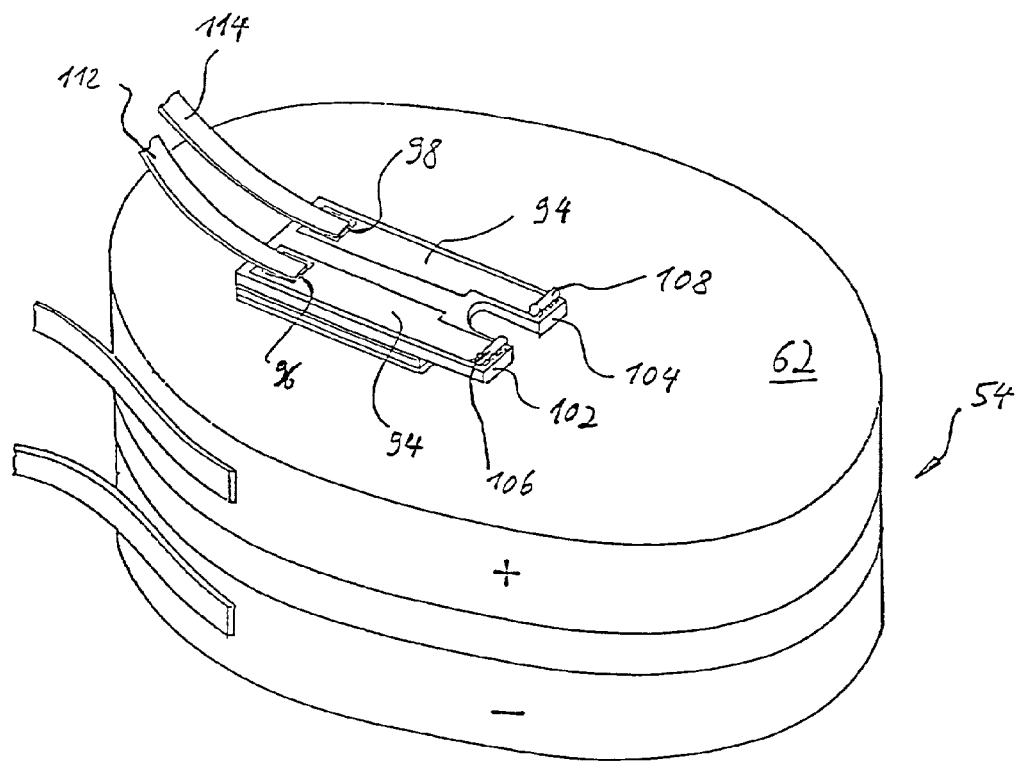
FIG. 3 is a perspective view of the embodiment of FIG. 2.
Figure 4:
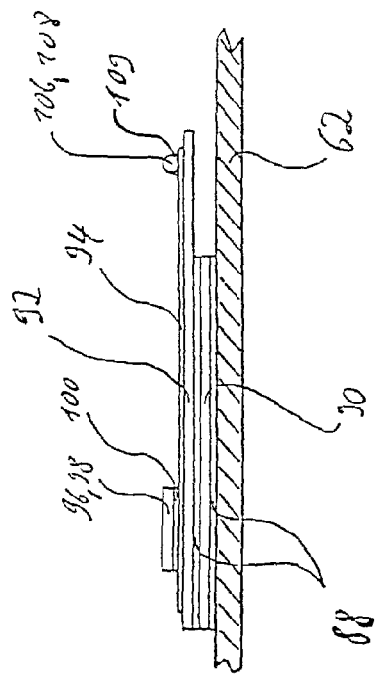
FIG. 4 is a partial extract of the view of FIG. 2.

A first embodiment of the secondary electrochemical cell is shown in FIGS. 2 to 4 and includes a hermetically tight protective housing 54 with a cup-shaped cover 56 and a likewise cup-shaped bottom 58. A hollow cylindrical side wall 60 of the cover 56 is welded to a cover plate 62, which, as a bulging membrane, forms the detector element of the secondary electrochemical cell. The bottom 58 is formed by a hollow cylindrical side wall 64 and a bottom plate 66 which is welded to it. The electrodes 2 and 4 of the secondary electrochemical cell are accommodated within the protective housing 54, the positive electrode 2 having a tap which is a contact clip 68 and which makes contact with the inside of the side wall 60. The negative electrode 4 of the secondary electrochemical cell is brought into electrically conductive contact by means of a contact clip 70 as a tap from the inside with the side wall 64, a recess 74 in the edge area of the bottom plate 66 facilitating the installation of the contact clip 70. The contact clips 68 and 70 are each soldered or welded electrically conductively to the side wall 60 and 64 and both can be provided with an insulating layer 73 which surrounds them, for example in the form of an insulating hose which has been slipped on. It goes without saying that instead of the solder or weld connection it can also be provided that the contact clips 68 and/or 70 are allowed to adjoin the corresponding housing parts merely elastically pretensioned, for which purpose either contact pressure elements such as metal foams or springs can be used or the contact clips 68, 70 themselves provide for the necessary contact pressure. In principle, any other form of electrical contact-making can also be used instead of the contact clip 69 and/or 70, thus for example a metal foam which has been inserted with pretensioning between the bottom of the cover plate 62 and one end face of the electrode 2 facing it, advantageously another metal foam being interposed between the top of the bottom plate 66 and one end face of the electrode 4 facing it.

The interior of the protective housing 54 is filled with an electrolyte 12, the positive and the negative electrode 2 and 4 being separated from one another by a separator 6 which is drawn schematically and which prevents direct electrical contact between the electrodes 2 and 4, but allows ion migration. The cover 56 and the bottom 58 each have an electrical terminal 76 and 78 which correspond to the terminals 16 and 18 as shown in FIG. 1, and both are made of an electrically conductive metallic material (for example, titanium) which is chemically inert to the electrolytes 12 and the electrodes 2, 4 and is resistant to the electrochemical processes which take place.

The side walls 60 and 64 are welded or soldered hermetically tight to one another via their end faces towards one another, with the interposition of an insulating ring 80, the insulating ring 80 having a smaller inside diameter than the side walls 60 and 64. For example, oxide ceramic can be used as the material for the insulating ring 80.

On the cover plate 62 a switching element labeled 86 throughout is attached; it corresponds to the make contact 44 of FIG. 1. As an important component the make contact 86 has a flexible contact carrier 92, for example of polyimide, which has the shape of a roughly rectangular thin-walled plate with one short side which has a U-shaped notch so that two spring arms 102, 104 are formed. Along the two longer sides on the top of the contact carrier 92 metal coatings 94 are attached which extend into the spring arms 102 and 104, where on the metal coatings 94 one section of a platinum wire at a time is soldered as a contact 106 or 108 via a solder connection 109. In the vicinity of the second short side of the contact carrier 94 a contact plate 96 and 98 is connected by means of a solder layer 100 to one of the two metal coatings 94. In doing so, the contact plates 96 and 98 each bear one terminal 112 and 114, so that the terminal 112 is electrically connected to the contact 106 and the terminal 114 is electrically connected to the contact 108. At a short distance over the contacts 106 and 108 there is a contact bridge 110 with which the contacts 106, 108 can be brought into contact in order to electrically short circuit them. The flexible contact carrier 92 is connected via a multilayer structure to the cover plate 62 such that the contacts 106, 108 are located in the middle over the cover plate 62 and in an overhead view run along the axis of symmetry of the round cover plate 62. As is shown in FIG. 4, the multilayer structure between the contact carrier 92 and the cover plate 62 includes, proceeding from the bottom of the contact carrier 92 facing the cover plate 62, an adhesive layer 88, a spacer plate 90 and a second adhesive layer 88. The multilayer structure extends roughly from the short side of the contact carrier 92, which has the contact plates 96, 98, as far as the base of the U-shaped notch which separates the two spring arms 102, 104 so that they stand freely at an exactly stipulated distance over the cover plate 62.

The contact clip 68 can be a fusible link which interrupts the electrical connection between the positive electrode 2 and its terminal 76 when the current flowing over it exceeds a stipulated boundary value. In this case, there can be insulation between one end face of the positive electrode 2 facing the cover plate 62 and the cover plate 62 itself. Accordingly the contact clip 70 can also be designed as a fusible link, and between the negative electrode 4 on the one side and the side wall 64 and/or the bottom plate 66 on the other side there can be insulation which prevents electrical contact when this fusible link triggers by means of the negative electrode 4 directly adjoining the housing parts 64 and/or 66.

If during operation of the secondary electrochemical cell the internal pressure within the protective housing 54 rises due to swelling (increase of volume) of the electrodes 2, 4 and/or by gas evolution and/or by a temperature increase, a bulge is specifically impressed on the detector element (cover plate 62) which is designed as a membrane by the other outside walls of the protective housing 54 being designed to be stiffer than the cover plate 62 and deforming only little. When the electrodes 2, 4 swell they can also touch the inner surfaces of the cover plate 62 and the bottom plate 66 directly or indirectly via insulating layers and/or the electrolyte 12 which can be a solid electrolyte, and in this way cause a change in shape of the cover plate 62.

The bulging of the cover plate 62 causes the contacts 106 and 108 of the contact bridge 110 to approach one another in order to touch the contact bridge 110 and to electrically short circuit the terminals 112 and 114 and via then the recharging circuit 22 when a boundary value of the internal pressure in the protective housing 54 which signals a still allowable operating state of the secondary electrochemical cell is exceeded, further power supply to the electrodes 2, 4 of the secondary electrochemical cell being suppressed. The flexible configuration of the spring arms 102, 104 prevents them from being damaged when the switching element 86 closes so that the break contact 86 in principle works reversibly. As the internal pressure in the protective housing 54 decreases, the switching element 86 again assumes its base position which is reproduced in FIG. 2.

The bulging of the cover plate 62 which leads to actuation of the switching element 86 is generally less than 300 microns, the protective housing 54 having, for example, an outside diameter of roughly 18 mm at a height of less than 5.5 mm, measured from the bottom plate 66 to the cover plate 62.

Figure 5:
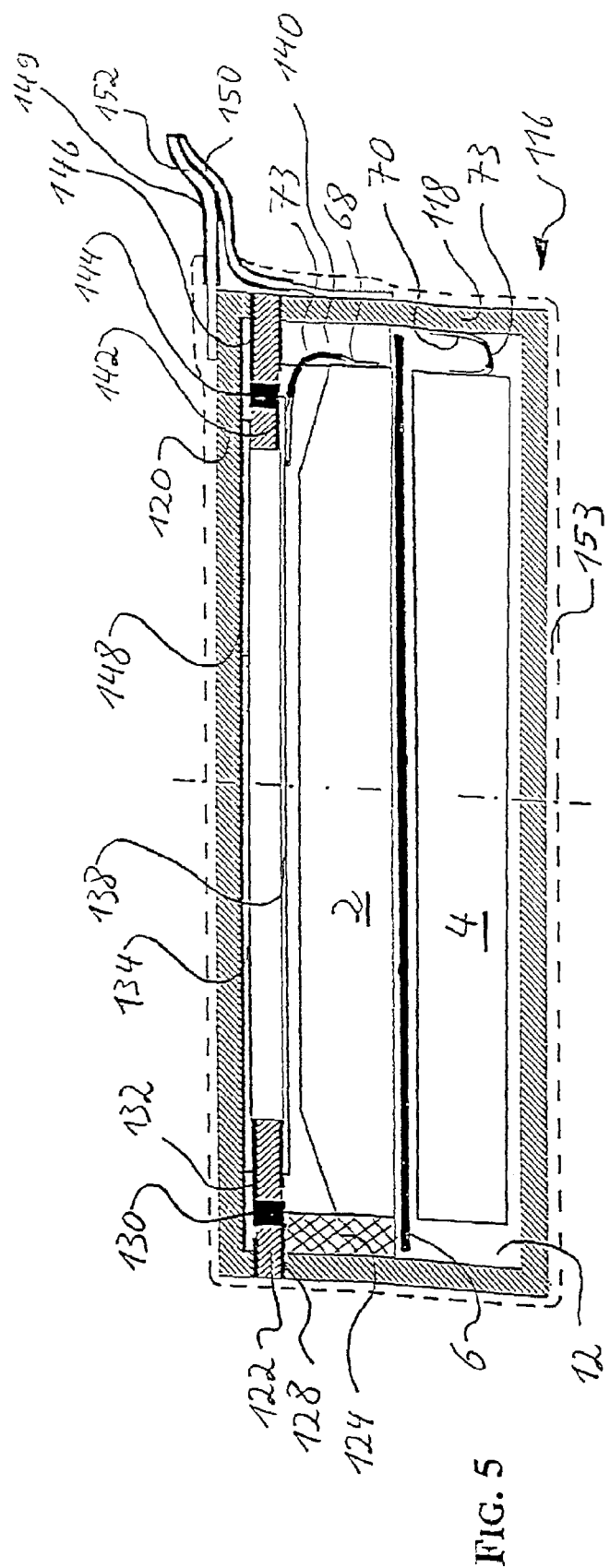
FIG. 5 is a cross-sectional view of a second embodiment of another secondary electrochemical cell.

FIG. 5 shows a second embodiment of a secondary electrochemical cell which has a protective housing 116 with a cup-shaped, one-part bottom 118 of electrically conductive material. The protective housing 116 is sealed by a likewise electrically conductive cover 120, between the cover 120 and the bottom 118, an insulating ring 122 of oxide ceramic being soldered in. The insulating ring 122 having an inside diameter which is less than that of the side wall of the bottom 118 bears on its bottom a membrane 138 and on its top a contact membrane 134 electrically insulated against one another. Both membranes 134 and 138 are made of electrically conductive material, the contact membrane 134 with its top being electrically insulated against the adjacent cover 120 by means of an insulating layer 148, and via a metal coating 132, through plating 130 and a solder layer 128 it being connected, in an electrically conductive manner, to the bottom 118. The electrodes 2 and 4, the separator 6 and the electrolyte 12 are surrounded hermetically tight by the bottom 118, the lower side of the insulating ring 122 and the membrane 138. The positive electrode 2 is centered in the protective housing 116 by an electrically insulating annular receiver 124 which is positioned between the side wall of the bottom 118 and the positive electrode 2 in the area between the separator and the lower side of the insulating ring 122 such that electrical contact between the side wall of the bottom 118 and the positive electrode 2 is not possible. A recess 140 in the receiver 124 facilitates installation of the contact clip 68 by means of which the positive electrode 2 makes electrical contact with the bottom of the membrane 138. A metal coating 142 on the lower side of the insulating ring 122, through plating 144 through the insulating ring 122, and a solder layer 146 close the electrical connection between the membrane 138 and the cover 120, with which, for its part, contact is made with an electrical terminal 152. An electrical terminal 150 on the outer side wall of the bottom 118 is electrically connected to the negative electrode 4 via the bottom 118 and the contact clip 70 which is connected to the inner side wall of the bottom 118.

While, therefore, the membrane 138 is connected to the positive electrode 2, the contact membrane 134, which is located at a distance which corresponds to the thickness of the insulating ring 122 from the membrane 138, makes contact with the negative electrode 4. This distance is such that in an unallowable operating state of the secondary electrochemical cell a bulge is impressed on the membrane 138 which acts as the detector element, which bulge is enough to establish electrically conductive contact with the contact membrane 134 so that the secondary electrochemical cell is electrically short circuited. Furthermore, a section of the solder connection 146 can be a fusible link which irreversibly burns through if a recharging or a discharging current exceeds a stipulated boundary value. Further energy supply and removal via the terminals 150, 152 is, thus, suppressed.

In the embodiment of the secondary electrochemical cell which is shown in FIG. 5, the combination of the membrane 138 and the contact membrane 134 is used as the reversibly operating switching element which is a make contact and which is mechanically actuated by the detector element 138. Since the two terminals 150, 152 are surrounded by a biocompatible insulating jacket 149 and a biocompatible polymer 153, for example, silicone jackets the protective housing 116 and the housing-side ends of the terminals 150, 152, the protective housing 116 can be directly implanted. The entire unit which is shown in FIG. 5 can be used as an energy supply module with terminals 150, 152 which are electrically connected to other components of the implantable device, preferably detachably via a coupling element, as is described in EP-A-0 982 784 (corresponding to co-assigned U.S. patent application Ser. No. 09/359,050) of the applicant which has not been published.

Figure 6:
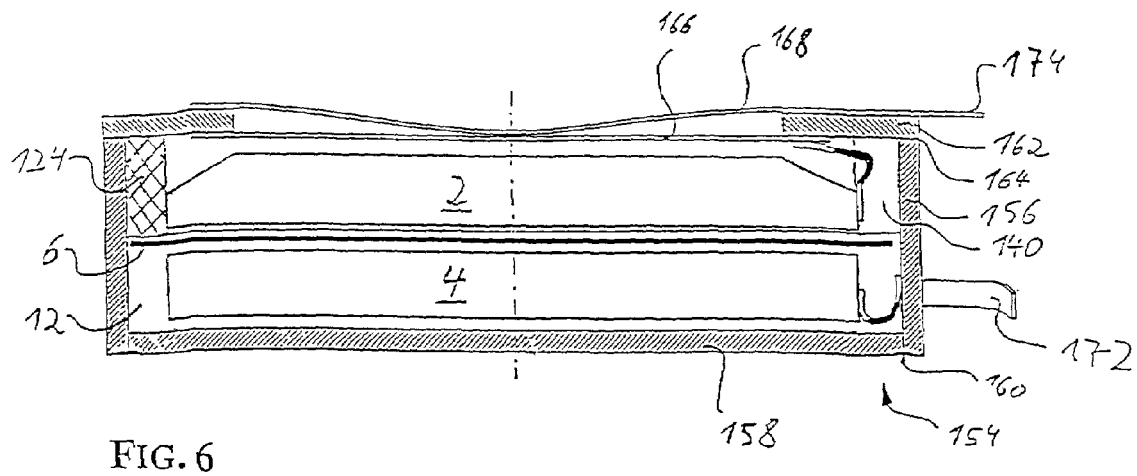
FIG. 6 is a cross-sectional view of a third embodiment of a secondary electrochemical cell with a switching element in the closed state.
Figure 7:
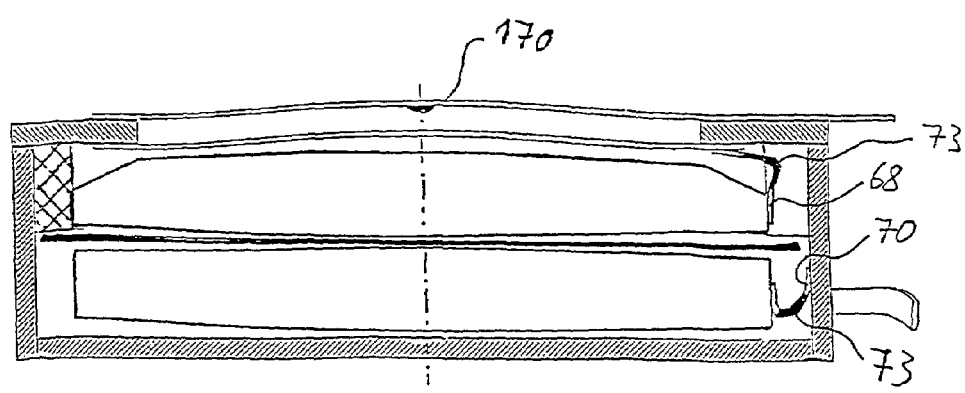
FIG. 7 is a cross-sectional view of the embodiment of FIG. 6 with a switching element in the opened state.

According to FIGS. 6 and 7, a third embodiment of a secondary electrochemical cell has a protective housing 154 with an electrically conductive bottom which has a side wall 156 in the form of a tube section which is sealed on the face side by a bottom plate 158. A peripherally closed weld 160 joins the bottom plate 158 to the side wall 156. On the second face side of the side wall 156, a solder layer 164 fixes a ceramic insulating ring 162 which has a round opening with an inside diameter which is smaller than the inside diameter of the side wall 156, on the bottom of the insulating ring 162 which points in the direction to the bottom plate 158 a membrane 166 of electrically conductive material, which spans the opening, being attached and a hermetically tight internal space being formed. This internal space holds the positive electrode via the receiver 124 such that electrical contact between the positive electrode 2 and the side wall 156 is precluded and the former is centered at the same time in the protective housing 154. While the positive electrode 2 makes electrical contact with the membrane 166 from underneath by means of the contact clip 68, the contact clip 70 forms an electrical contact between the negative electrode 4 and the side wall 156. An electrically conductive contact membrane 168 with a center contact point 170 which points downward is connected on the top of the insulating ring 162 to the latter and spans its opening. The contact membrane 168 has an elastic preliminary bulge to the inside in the direction to the membrane 166 and is in electrical contact with the membrane 166 by means of the contact point 170. In this position of the contact membrane 168 energy can be supplied and removed to and from the secondary electrochemical cell via a terminal 174 which is electrically connected to the contact membrane 168 and a terminal 172 which has made contact with the outside of the side wall 156. If an unallowable operating state of the secondary electrochemical cell occurs, the membrane 166 and with it the contact membrane 168 are caused to bulge so far to the outside that the contact membrane 168 springs to the outside via an unstable equilibrium position and electrical contact between the two membranes 166, 168 remains interrupted even if the membrane 166 should again return to its original position as shown in FIG. 6.

Figure 8:
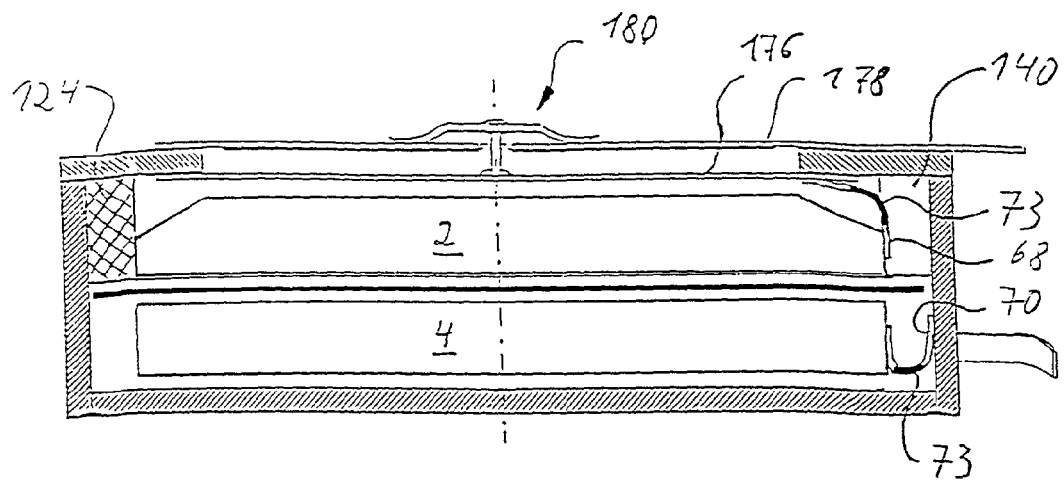
FIG. 8 is a cross-sectional view of another embodiment of a secondary electrochemical cell with a switching element in the closed state.
Figure 9:
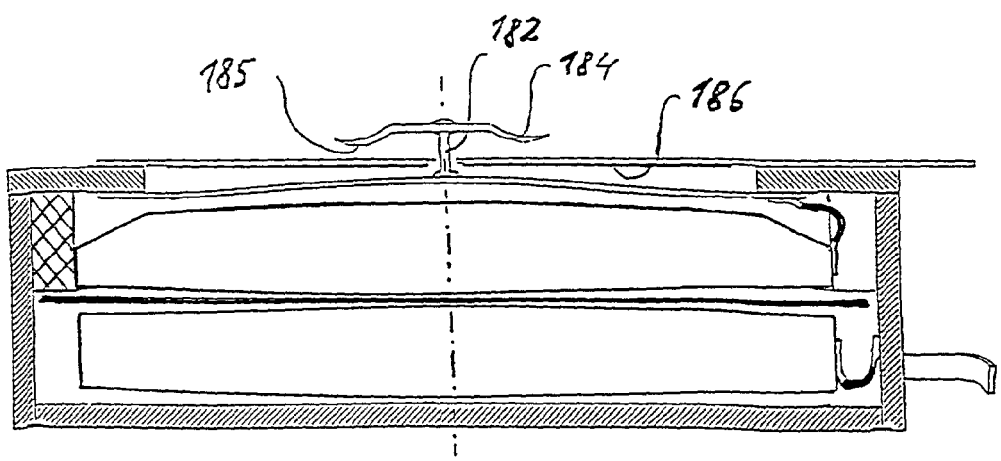
FIG. 9 is a cross-sectional view of the embodiment of FIG. 8 with a switching element in the opened state.

A fourth embodiment of the secondary electrochemical cell which is illustrated in FIGS. 8 and 9 has a protective housing which differs from the protective housing 154 essentially only by the configuration of the membranes 166, 168 and their electrical contact-making. A membrane 176 which corresponds to the membrane 166 centrally bears on its top a contact spring which is labeled 180 throughout, with a pin 182 and a spring plate 184. The cylindrical pin 182 is fixed with one face side on the membrane 182 on which it stands vertically with its longitudinal axis, and with its second face side is connected to the spring plate 184. In doing so, the pin 182 penetrates an opening in a contact membrane 178 which corresponds to the contact membrane 168 of the protective housing 154, the spring plate 184 being in electrically conductive contact with the contact membrane 178 in the base position which is shown in FIG. 8 with a contact surface 185 which faces the top of the contact membrane 178 and which is located in the vicinity of its outside edge. In the base position the membranes 176, 178 run roughly parallel and the contact surface 185 lies elastically pretensioned on the contact membrane 178. In an unallowable operating state of the secondary electrochemical cell a bulge to the outside in the direction to the contact membrane 178 is impressed on the membrane 176 and the contact membrane 178 essentially does not deform and retains its location. The bulging of the membrane 176 is enough to lift the contact surface 185 from the contact membrane 178 and to reversibly interrupt electrical contact, but is not so large that the top of the membrane 176 comes into contact with the bottom of the contact membrane 178. To guarantee the latter, even when the membrane 176 bulges more dramatically, the bottom of the contact membrane 178 is provided with an insulating layer 186.

Figure 10:
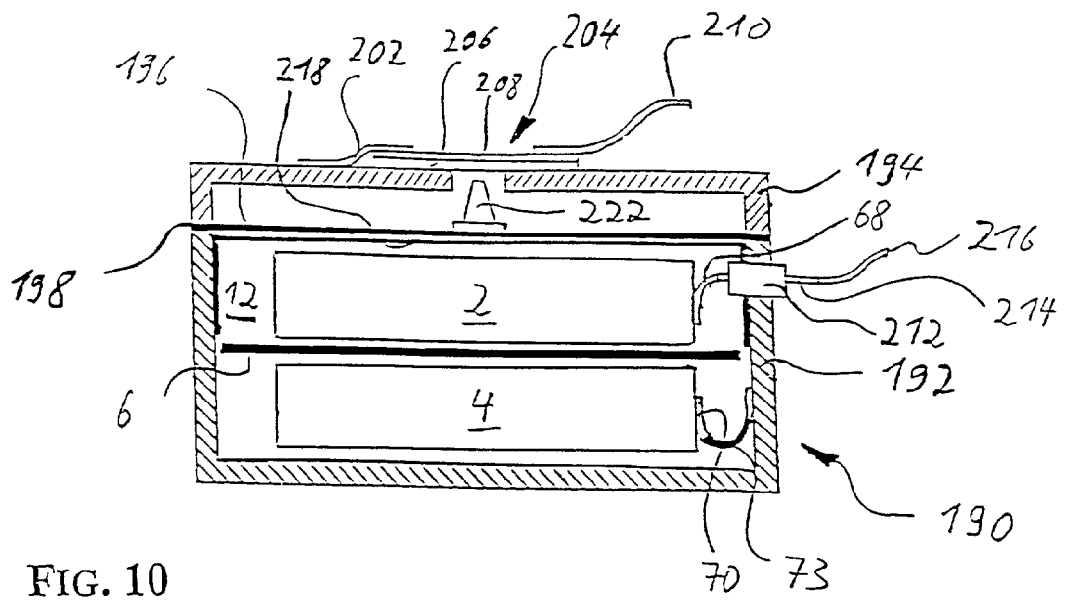
FIG. 10 is a cross-sectional view of another embodiment of a secondary electrochemical cell with an irreversibly operating switching element.

A fifth embodiment of a secondary electrochemical cell as shown in FIG. 10 includes a protective housing 190 with a one-piece, cup-shaped bottom 192, a likewise cup-shaped cover 194 and a membrane 196 which is connected by a weld 198 on the facing end sides of the bottom 192 and the cover 194 to them, the bottom 192, the cover 194 and the membrane 196 preferably bring of the same electrically conductive material. The membrane 196 divides the protective housing 190 horizontally into a top cover area and a bottom, hermetically tight space which holds the positive and the negative electrode 2 and 4, the separator 6 and the electrolyte 12. The negative electrode 4 makes contact by means of the contact clip 70 with the bottom 192, with a side wall which holds a single-pole penetration 214 via a ceramic substrate 212 hermetically tight and electrically insulated with reference to the side wall of the bottom 192. The contact clip 68 establishes electrical contact between the positive electrode 2 and one end of the penetration 214 which projects into the hermetically tight space of the protective housing 190; its other end projects over the side wall of the bottom 192 to the outside and is electrically connected to a terminal 216.

On the bottom of the membrane 196 facing the positive electrode 2 and on the inner surface of the side wall of the bottom 192 adjacent to this electrode, an insulating layer 218 is applied to prevent electrical contact between the membrane 196 and the side wall of the bottom 192 and the positive electrode 2. On the top of the membrane 196 in the center is a plunger 222 which projects into an opening in the cover 194. At a short distance above the upper edge of the plunger 222, there is a bursting element 204 which spans the opening. This element includes, on its side facing the top of the cover 194, a substrate 206 with a conductive layer 208. The substrate 206 can be ceramic, for example, oxide ceramic, glass or the like. The conductive layer 208 on one side of the opening in the cover 194 makes contact with the latter via a contact clip 202 and on the opposite side of the opening is provided with a terminal 210 which in this way is electrically connected to the negative electrode 4.

In an unallowable operating state of the secondary electrochemical cell a bulge is impressed on the membrane 196, whether by an increase in the volume of the electrodes 2, 4 and/or a temperature rise and/or gas evolution in the operation of the secondary electrochemical cell and it is enough for the plunger 222 to destroy the bursting element 204 so that the conductive layer 208 between the contact clip 202 and the terminal 210 is irreversibly interrupted.

Figure 11:
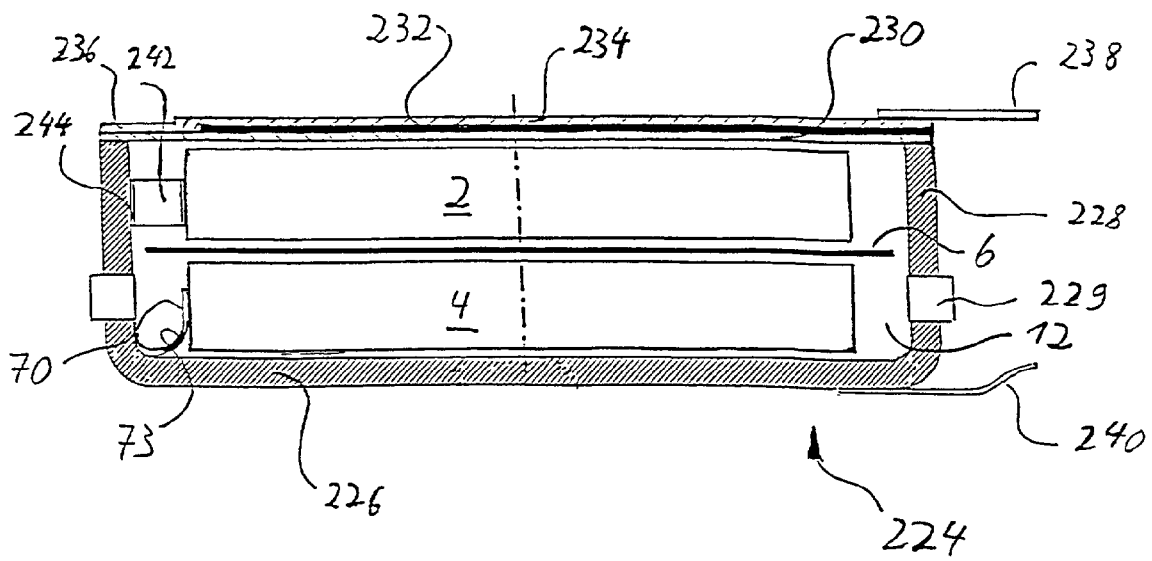
FIG. 11 is a cross-sectional view of another modified embodiment of a secondary electrochemical cell.

As is shown in FIG. 11, a sixth embodiment of a secondary electrochemical cell has a protective housing 224 with a flat, electrically conductive, shell-shaped bottom 226 which is connected via its end face which points upward with the interposition of a ceramic insulating ring 229 to a side wall 228 which has the shape of a tube section. The side wall 228 is sealed hermetically tight on its upper face side with an electrically conductive membrane 230. On the outside of the membrane 230, which points upward, an insulating layer 232 is applied and on the latter an electrically conductive, brittle bursting layer 234 is applied. The bursting layer 234 in the area of the side wall 228 is connected electrically conductively to a membrane 230 at a first site via contact-making 236 and at a second diametrically opposite site to a terminal 238. The bursting layer 234 extending in the manner of a strip between these two sites. Via the terminal 238, the positive electrode 2 is tapped from outside of the protective housing 224, for which purpose the positive electrode 2 makes contact by means of a contact clip 242, which latter forms via a weld connection 244 electrical contact with the inside of the side wall 228. The negative electrode 4 is connected via the contact clip 70 to the inside of the bottom 226 and can be tapped from outside the protective housing 224 by means of the terminal 240. It goes without saying that alternatively to the weld connection 244, for example, there can also be a solder connection. In an unallowable operating state of the secondary electrochemical cell a bulge is impressed on the membrane 230 and it irreversibly destroys the bursting layer 234 and, thus, interrupts the electrical connection between the positive electrode 2 and the terminal 238.

Figure 12:
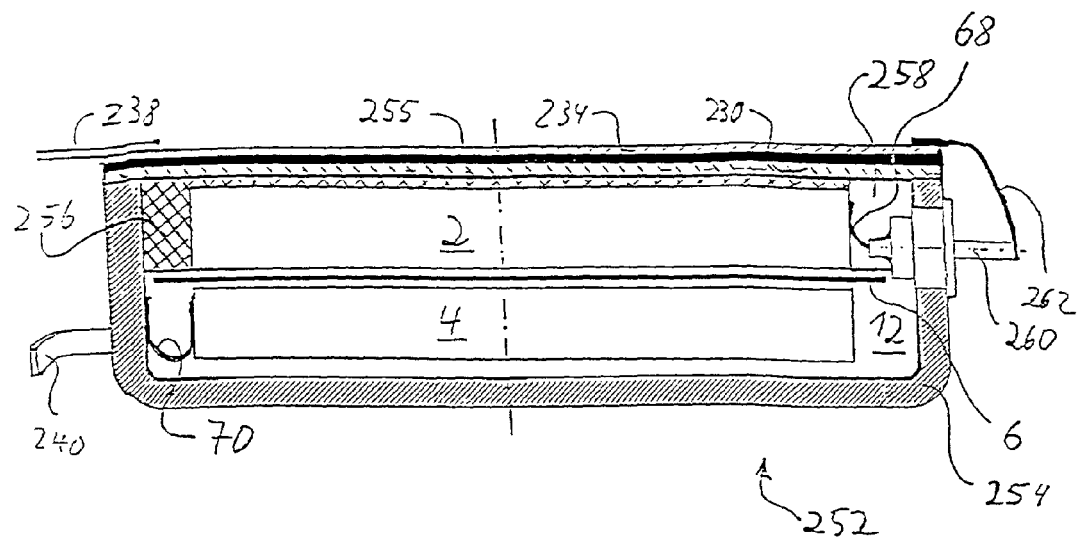
FIG. 12 is a cross-sectional view of a secondary electrochemical cell with a hermetically tight single-pole penetration through the outside wall of a protective housing to form a current path to or from an electrode of the secondary electrochemical cell.

A seventh embodiment of a secondary electrochemical cell is shown in FIG. 12 and includes a protective housing 252 which differs from the protective housing 224 essentially only by the configuration of the bottom 226 and that of the current path to and from the positive electrode 2. The protective housing 252 has a bottom 254, with side walls which are routed as far as the membrane 230 and are welded to it in a hermetically tight and electrically conductive manner, so that the insulating ring 229 of the protective housing 224 is eliminated. The positive electrode 2 is held in a cup-shaped, electrically insulating receiver 256 which electrically insulates the positive electrode 2 with reference to the side wall of the bottom 254 and the membrane 230 and keeps it in a predetermined position. The contact clip 68 is placed in the area of a recess 258 of the receiver 256 and is used for contact-making of the positive electrode 2 to the first end of a single-pole penetration 260 which is held hermetically tight and electrically insulated in the side wall of the bottom 254. The second end of the penetration 260 projects over the outside of the side wall of the bottom 254 and is brought via a contact clip 262 into electrical connection with the electrically conductive bursting layer 234 which is insulated completely by an insulating layer 255 relative to the membrane 230 and the bottom 254.

Figure 13:
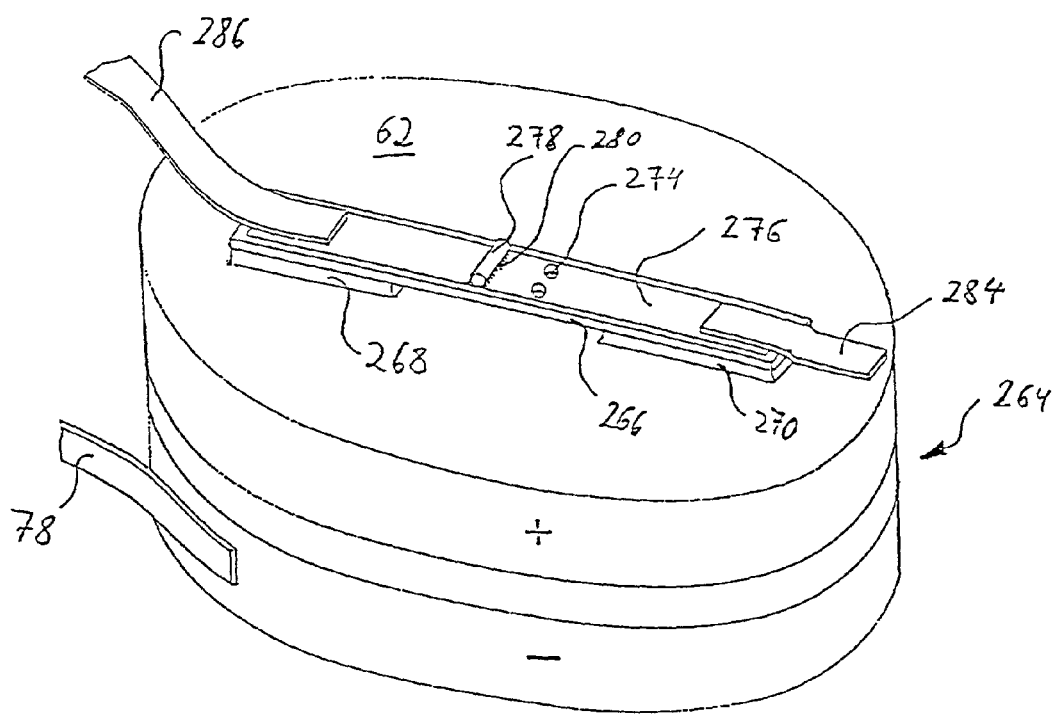
FIG. 13 is a perspective view of another embodiment of a secondary electrochemical cell with a short circuit switch and a bursting strip as an irreversible break-contact.
Figure 14:
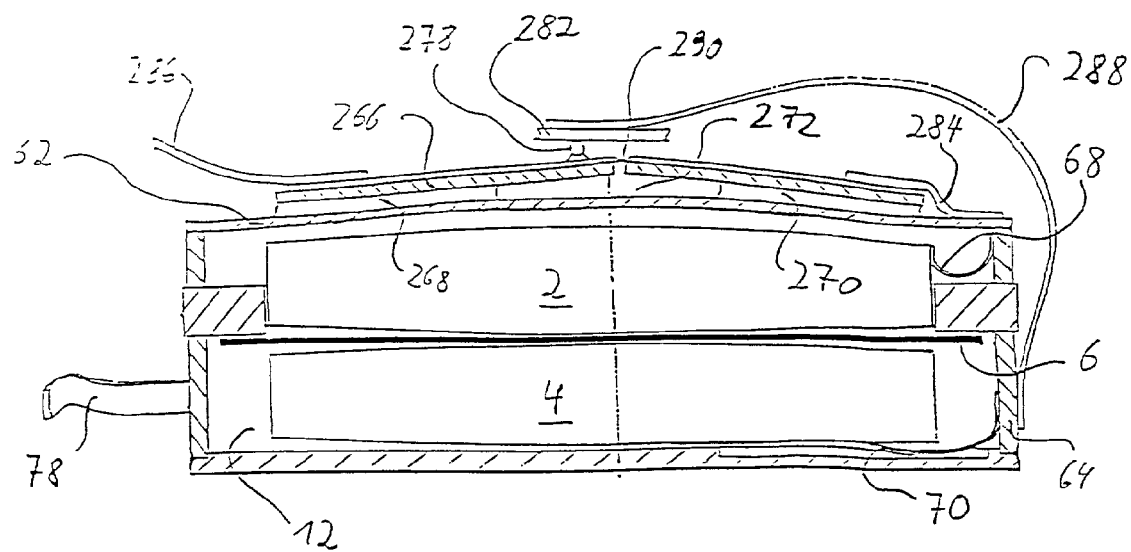
FIG. 14 is a cross-sectional view of the embodiment of FIG. 13.

According to FIGS. 13 and 14, an eighth embodiment of a secondary electrochemical cell uses a modified protective housing 264 which corresponds for the most part to the protective housing 54 of FIGS. 2 to 4, but does not use its switching element 86 and in which the current path from and to the positive electrode 2 is accomplished in a modified form. A rectangular bursting strip 266 is coupled from the outside via adhesive connections 268 and 270 each roughly in the outer third of its longer side to the cover plate 62 of the protective housing 264 at a stipulated distance so that a bridging zone 272 is formed between the adhesive connections 268 and 270. The line of symmetry in the direction of the longer side of the bursting strip 266 runs essentially parallel to the center line of the round cover plate 62, and the center of the bridging zone 272 is located above the center of the cover plate 62. On the top of the bursting strip 266, a conductive layer 276 is applied which extends over almost the entire top of the bursting strip 266 and which makes contact with the cover plate 62 in the area of one short side of the bursting strip by a contact clip 284 and with a terminal 286 in the area of the other short side. Thus, an electrical connection is established between the terminal 286 and the positive electrode 2.

In the area of the bridging zone 272 which is free of the adhesive layer, near one side bisector of the longer side of the bursting strip 266, in the latter there is scoring in the form of a perforation 274. The scoring can of course also be produced in some other suitable way, for example by notching, scratching or narrowing of the bursting strip 266. Adjacent to the perforation 274, by means of a solder connection 280 a wire section is fixed as a short circuit contact 278 via which there is an opposite contact 282 at a certain distance. The opposite contact 282 is an electrical contact via a contact clip 288 with the side wall 64, i.e with the negative electrode 4. In an unallowable operating state of the secondary electrochemical cell, a bulge is impressed on the cover plate 62 as a bulging membrane and it is transferred via the adhesive connections 268, 270 to the bursting strip 266 which breaks along the perforation 274 according to FIG. 14. The short circuit contact 278 is pressed against the opposite contact 282 and the short circuit current between the positive and the negative electrode 2 and 4 is enough to bum through a possibly residual fragment 290 of the conductive layer which at least partially spans the fracture site. In this way, the current path between the positive electrode 2 and the terminal 286 is irreversibly interrupted.

Since it is necessary to predict the bulging necessary to break the bursting strip 266 in the range of a few hundred microns, preferably in the range of less than 200 microns, the predetermined geometry of the bursting strip 266 must be maintained very precisely. The material for the bursting strip 266 can be, for example, glass or ceramic, and it can be advantageous to impress mechanical pretension on the bursting strip which increases the distance of the fracture sides after bursting of the scoring. To do this, the bursting strip 266 can be made as a composite element of at least one glass or ceramic material and at least one metal which are cemented or soldered to one another. Pretensioning of the bursting strip 266 can likewise be induced by using a metal with shape memory (memory effect).

It is furthermore possible to produce the bursting strip 266 from a piezoelectric material or at least provide it with one such layer. In deformations of the bursting strip 266 which do not lead to its rupture, therefore which do not signal an unallowable operating state of the secondary electrochemical cell, electrical information delivered by the piezoelectric converter can be tapped in the form of charge changes by the optional evaluation electronics 52 in order for example to actuate a switching element which corresponds to the break contact 48 or 50 of FIG. 1 and to interrupt recharging or discharging of the electrodes 2, 4 of the secondary electrochemical cell before the secondary electrochemical cell reaches an unallowable operating state.

In the embodiment as shown in FIGS. 13 and 14, it is conceivable that the position of the perforation 274 and the short circuit contact 278 could be exchanged for one another with reference to the side bisector of the longer side of the bursting strip 266 so that the short circuit contact 278 comes to rest on the side of the rupture edge which is the right one in FIG. 14. In this case a short circuit current cannot burn through a possible remaining fragment 290 of the conductive layer, but the secondary electrochemical cells are forced to completely discharge, and then the contact clips 68 and/or 70 could not be designed as fusible links, as is fundamentally possible (compare the corresponding statements on the protective housing 54 of FIGS. 2 to 4). If repeatedly redundant protection is unnecessary, it is furthermore conceivable to completely abandon the short circuit contact 278 and the opposite contact 282, to use only the irreversible break contact function of the bursting strip 266 and to design it such that in any case it is ensured that when the bursting strip 266 ruptures a fragment 290 of the conductive layer does not remain.

Figure 15:
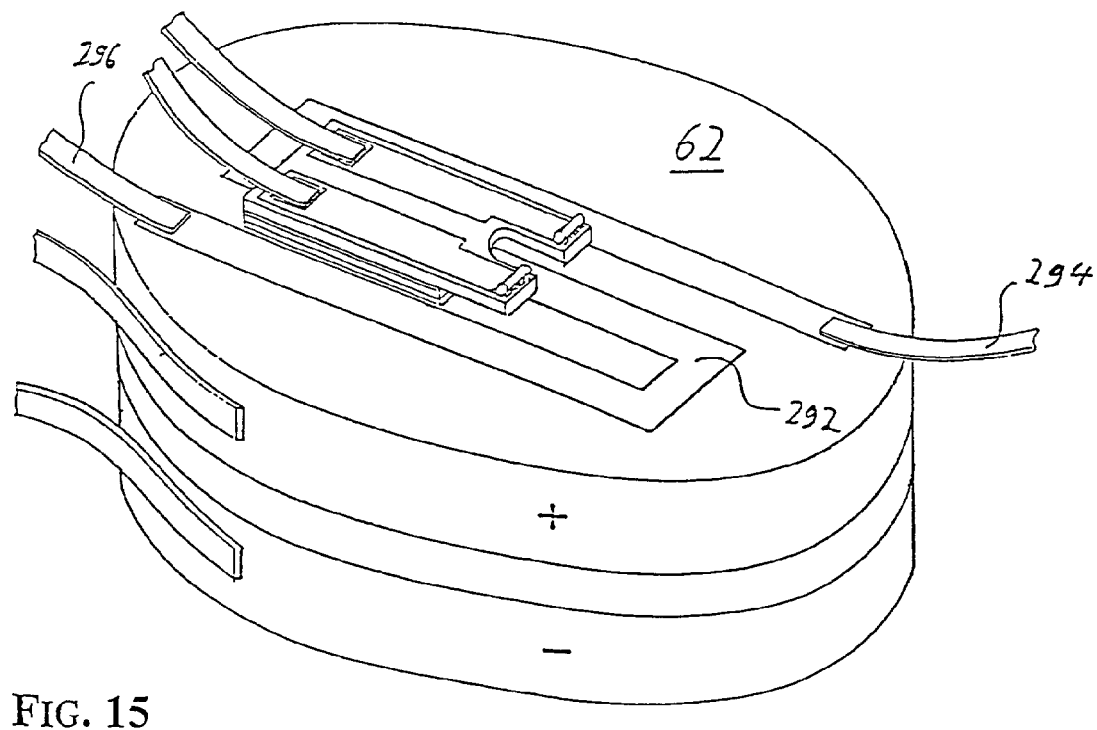
FIG. 15 is a perspective view of another embodiment of a secondary electrochemical cell.

A ninth embodiment of the secondary electrochemical cell is shown in FIG. 15 and differs from the embodiment of FIGS. 2 to 4 essentially only in that, to increase the redundancy, a strain gauge 292 is applied in a meander configuration to the top of the cover plate 62. When the cover plate 62 bulges, the strain gauge 292 experiences a change in shape which leads to a change of its electrical resistance which is acquired via the terminals 292 and 296 by the evaluation electronics 52 and is used for example to actuate other switching elements, for example, for an electrically actuatated make contact which can be placed away from the protective housing and in function corresponds to the make contact 46 or the break contact 50 of FIG. 1. The evaluation electronics 52 can furthermore activate a warning means which is not shown and which notifies a user about the malfunction of the secondary electrochemical cell.

A protective housing 298 which is shown in FIG. 16 encompasses the switching element 86 which has already been described in conjunction with the protective housing 54 of FIGS. 2 to 4 and differs from the protective housing 54 essentially only by the following configuration features: A metallic, preferably titanium bottom is made cup-shaped, a hollow cylindrical side wall 300 on its bottom face side being sealed in one piece with a bottom plate 302. On the top face side of the side wall 300 a cover plate 304, which is a bulging membrane, is welded hermetically tight and it is likewise made of titanium. A cup-shaped receiver 306 is held within the protective housing 298 such that its cylindrical side wall has an outside diameter which corresponds to the inside diameter of the side wall 300 and its bottom plate rests on the bottom plate 302. The inside contour of the receiver 306 is matched to the outside contour of the positive electrode 2, the latter being fixed and centered in the radial direction within the protective housing 298. The receiver 306 being, like the already described receivers 124 (FIGS. 5 to 9) and 256 (FIG. 12), of an electrically insulating material, preferably of a plastic material such as polytetrafluorethylene (PTFE), and insulates the positive electrode 2 with reference to the metallic outside walls of the protective housing 298. The receiver 306 is provided on the outside of its side wall with a recess 308 and is, thus, inserted into the protective housing 298 such that the recess 308 is facing an opening 310 which is made in the side wall 300 in the radial direction.

The cylindrical opening 310 in the side wall 300 is surrounded on the outside of the side wall 300 by a flat cylindrical surface 312 into which a shoulder 314, which points to the outside, of a sleeve-shaped, metallic, preferably titanium receiver 316 is fitted and welded hermetically tight. In the receiver 316 an electrically insulating, inorganic-nonmetallic housing section of the protective housing 298 in the form of a ceramic substrate 318, for example, of $AL_2O_3$, is held such that the substrate 318 with its outside diameter is matched to the inside diameter of the receiver 316 and up to the collar on the inside wall of the receiver 316 is inserted into the latter and is located in the axial direction to the side of the receiver 316 which faces the shoulder 314. On the opposite side the substrate 318 projects above the receiver 316 and is connected hermetically tight to it via a gold solder connection 320. The substrate 318 for its part accommodates a twin-pole penetration 315 which includes two metallic contact pins 322 and 324, which preferably is a platinum-iridium compound and form one pole each of the twin-pole penetration 315. The contact pins 322 and 324 which are shown in FIG. 16 in a position which has been turned by 90° around the axis of the receiver 316 penetrate the substrate 318 in the axial direction and are fixed hermetically tight in it in the same manner by a gold solder connection 326. They have a length which is sufficient to axially project above the face side of the shoulder 314 and that of the substrate 318, the contact pins 322 and 324 projecting into the recess 308 on the side facing the interior of the protective housing 298. The pin 322 makes contact, via a contact clip 332, with the positive electrode 2 and the contact clip 330 forms a current path between the negative electrode 4 and the contact pin 324. The two contact clips 330 and 332 are each surrounded by an insulating hose 334. To place the metallic housing sections (i.e. the side wall 300, the bottom plate 302, the cover plate 304 and the receiver 316) of the protective housing 298 specifically at the potential of the negative electrode 4, the penetration 315 has a solder bridge 328 which extends between the contact pin 324 and the receiver 316. Outside of the protective housing 298 the positive electrode 2 and the negative electrode 4 are each tapped via a terminal 338 or 336.

The protective housing 298 compared to the protective housing 54 can be produced with lower cost since the bottom of the protective housing 298 is made in one piece and no ceramic insulating ring 80 is used. The especially critical metal ceramic transition is minimized and limited to a part which is to be produced and tested separated and which includes the components 316, 318, 322 and 324. This contributes to increased compressive strength of the protective housing 298.

As follows from FIG. 17, the protective housing 340 viewed in the direction of its smallest extension, instead of a cylindrical cross section, can also have a different, for example roughly droplet-shaped cross section. In the embodiment of the protective housing 340 as shown in FIG. 17, the side wall is formed by one segment 342 in the form of a three quarters circle and two linear segments 344 and 346 which tangentially join one another to both sides of the three quarters circle, the segments adjoining one another via a rounded area which lies between them. The side wall is metallic, preferably of titanium and together with a one-piece bottom plate forms a cup-shaped bottom. A cover plate, which is not shown and which likewise is preferably titanium, is welded hermetically tight to the upper face of the side wall. For the sake of clarity the wall thickness of the segments 342, 344 ad 346 is shown enlarged. The electrodes 2 and 4 are fixed within the protective housing 340 by a centering arrangement which is not shown, at least one of the electrodes 2 and 4 being electrically insulated with reference to the cup-shaped bottom and the cover plate preferably by the centering arrangement. In doing so, the centering arrangement can be a cup-shaped receiver similar to receiver 256 (compare FIG. 12) or the receiver 306 (FIG. 16) which in addition to the centering function also satisfies the object of electrical insulation. Furthermore, the inside of the cup-shaped bottom which faces the electrodes 2, 4 and/or of the cover plate can be provided with an insulating layer.

A penetration is made with two poles, in contrast to the embodiment as shown in FIG. 16 the receiver 316 is omitted, so that a ceramic substrate 350 is soldered, not in the receiver, but directly into the side wall of the protective housing 340, hermetically tight, for which preferably gold solder is used. The ceramic substrate 350 is soldered into the linear segment 344, but it is also possible to house the former in the circular segment 342. Metallic contact pins 354 and 356 which each form one pole of the twin-pole penetration 348 are soldered hermetically tight in the ceramic substrate 352 and are used for separate routing of the current path from or to the two electrodes 2 and 4 through the wall of the segment 344. With respect to the preferred selection of materials for the contact pins 354, 356 and the substrate 350 reference is made to the statements on the penetration 315. In the penetration 348 there can also be an electrical connection which is similar to the solder bridge 328 (see FIG. 16 between the contact pin 354 or 356 and the segment 344 in order to place the housing specifically at a negative or positive potential. Advantageously, the housing is connected electrically conductively to the negative electrode 4 and the positive electrode 2 is insulated with respect to the housing.

A cylindrical opening in the segment 346 by means of a solder connection accommodates a ceramic substrate 358 which is penetrated by two contact pins 360 and 362 which are held in the substrate 358 via a solder connection and project above it axially to either side. The opening in the segment 346 is sealed hermetically tight on the outside by a metallic membrane 364, the membrane 364 in the base state, i.e. at a not unduly elevated pressure within the protective housing 340 with its inside which points toward the interior of the protective housing 340, adjoining the contact pins 360 and 362 with a defined prestress and electrically connecting them. The membrane 364 which acts as the detector element is located outside of a section of the protective housing 340 which holds the electrodes 2 and 4, an opening 366 which run essentially in the direction of the lengthwise axis of the contact pins 360, 362 in the substrate 358 ensuring a fluid connection between the membrane 364 and the section of the protective housing 340 which holds the electrodes 2 and 4.

While one contact clip 372 connects a tap 384, provided on the positive electrode 2, directly to the contact pin 356 of the penetration 348, the second contact pin 354 of the penetration 348 makes contact with one tap 382 of the negative electrode 4 with the interposition of a break contact. The break contact includes a contact pair which is formed from the contact pins 360, 362, and the membrane 364. In doing so, there is one contact clip 368 between the tap 382 and the contact pin 360 and there is one contact clip 370 between the contact pin 362 and the contact pin 354.

The membrane 364 does allow detection of swelling of the electrodes 2, 4 by the electrodes 2, 4 directly or indirectly adjoining the membrane 364, but swelling of the electrodes 2 and 4 leads, in the same way as gas evolution and/or a temperature rise during operation of the secondary electrochemical cell to an increase in the internal pressure in the protective housing 340. If within the hermetically tight protective housing 340 a predetermined pressure boundary value which signals a still allowable operating state of the secondary electrochemical cell is exceeded, a bulge is impressed on the membrane 364 which is in fluid communication with the interior of the protective housing 340 via the opening 366 and the bulge is enough to lift the membrane 364 off the contact pins 360 and 362. The electrical connection between the two contact pins 360, 362 and thus between the negative electrode 4 and the contact pin 354 of the penetration 348 is then reversibly interrupted.

The protective housing 340 has another switching element which is integrated in the circular segment 342 and is made as a reversible make contact. This switching element can be present additionally to or instead of the above described break contact. A membrane 380 is at the same time the detector element and part of the make contact. It is provided on the inside of the segment 342 which faces the electrodes 2, 4 and closes an opening in the segment 342. In the cylindrical opening a ceramic substrate 374 is soldered such that two contact pins 376 and 378, which axially penetrate the substrate 374 in the base position of the membrane 380, are at a predetermined distance to their outside. The membrane 380 is made electrically conductive at least in the area of its outside, which area is adjacent to the contact pins 376, 378. But, preferably, the entire membrane 380 is made electrically conductive, especially of a material which agrees with the material of the metallic bottom and the cover plate of the protective housing 340 and it is welded in the segment 342. In this case it is entirely at the electrical potential of the indicated metallic housing parts.

The membrane 380 need not necessarily seal the opening in the segment 342 hermetically tight. It is enough if it is tight enough to experience a bulge for an unallowably high pressure rise within the protective housing 340 (in FIG. 17 shown by a broken line) which brings at least its conductive area into electrical contact with the contact pins 376 and 378 and electrically short circuits them. The hermetic tightness must then be ensured by the substrate 374 which would have to be soldered hermetically tight to the segment 342 and likewise to the contact pins 376, 378. Furthermore, a compression space formed between the substrate 374 and the membrane 380 would have to be considered in the design of the membrane 380. Conversely, if the membrane 380 seals the opening in the segment 374 hermetically tight, which is preferred, a hermetically tight configuration of the substrate 374 and the corresponding solder connections between the substrate 374 and the contact pins 376, 378 and the segment 342 is not absolutely necessary, but makes sense under certain circumstances.

It goes without saying that the protective housing 340 can be designed such that swelling or expansion of the volume of the electrodes 2 and/or 4 in the direction of bulging of the membrane 380, i.e. essentially perpendicular to the smallest extension of the protective housing 340, actuates the membrane 380 by the electrodes 2 and/or 4 adjoining the membrane 380 directly or indirectly for example via an insulating layer. Preferred materials for contact pins 360, 362, 376, 378 and the substrates 358 and 374 of the break contact or the make contact correspond to those of the contact pins 354 and 356 of the penetration 348 and the substrate 350.

The make contact of the protective housing 340, which includes the membrane 380 and a contact pair which is formed by the contact pins 376, 378, can be used for example according to the make contact 44 (see FIG. 1) in order to directly short circuit the recharging circuit 22. It is likewise possible to monitor the make contact by means of the evaluation electronics 52 which, for its part, actuates other switching elements or the already mentioned warning device.

One major advantage of the protective housing 340 is that it fits very flatly into the side wall of the protective housing 340 by integration of all detector and switching elements and the penetration and in the direction of its smallest extension has a thickness which is essentially larger than that of the electrodes/electrolyte system by the wall thicknesses of the bottom and the cover plate.

While various embodiments in accordance with the present invention have been shown and described, it is understood that the invention is not limited thereto, and is susceptible to numerous changes and modifications as known to those skilled in the art. Therefore, this invention is not limited toe the details shown and described herein, and includes all such changes and modifications.

The invention claimed is:

1. A secondary electrochemical cell for an implantable medical device, said cell comprising:
   a hermetically sealed biocompatible housing suitable for implantation;
   a positive electrode in said housing;
   a negative electrode in said housing;
   said positive electrode and said negative electrode each comprising an active material and both being directly, without the use of any further housing, accommodated entirely within said hermetically sealed housing;
   a detector at least operatively connected to said housing, wherein said detector is constructed and arranged to sense a predetermined operating state of said cell; and
   a switch that is responsive to said detector sensing said predetermined operating state to switch from a first state to a second state, wherein said switch in said second state prevents at least one of a recharging operation and a discharging operation;
   wherein said detector is a membrane which forms a portion of said switch.

2. The cell of claim 1, wherein said first state of said switch is an open circuit and said second state is a closed circuit.

3. The cell of claim 1, wherein said first state of said switch is a closed circuit and said second state is an open circuit.

4. The cell of claim 1, wherein said first state of said switch is a closed circuit and said second state is an open circuit and wherein said second state interrupts a connection of said cell with a charging device.

5. The cell of claim 1, wherein said first state of said switch is a closed circuit and said second state is an open circuit and wherein said second state interrupts a connection of said cell with a consumer circuit.

6. The cell of claim 1, wherein said first state of said switch is an open circuit and said second state is a closed circuit and wherein said second state short circuits a charging device connected to said cell.

7. The cell of claim 1, wherein said first state of said switch is an open circuit and said second state is a closed circuit and wherein said second state short circuits said cell.

8. The cell of claim 1, wherein said secondary state of said switch is reversible.

9. The cell of claim 1, wherein said detector is enclosed within said housing.

10. The cell of claim 1, wherein said electrodes are located on opposite sides of an electrical insulator which allows ion migration between the electrodes, and wherein each of the electrodes is connected to an inner surface of an electrically conductive section of the hermetically sealed housing by an electrically conductive tap.

11. A secondary electrochemical cell for an implantable medical device, said cell comprising:
   a hermetically sealed biocompatible housing suitable for implantation;
   a positive electrode in said housing;
   a negative electrode in said housing;
   said positive electrode and said negative electrode each comprising an active material and both being directly, without the use of any further housing, accommodated entirely within said hermetically sealed housing;
   a detector at least operatively connected to said housing, wherein said detector is constructed and arranged to sense a predetermined operating state of said cell;
   a switch that is responsive to said detector sensing said predetermined operating state to switch from a first state to a second state, wherein said switch in said second state prevents at least one of a recharging operation and a discharging operation; and
   at least one overcurrent protection unit that is constructed and arranged to limit current in at least one of a recharging circuit and a consumer circuit that is connected to said cell.

12. The cell of claim 11, wherein said at least one overcurrent protection unit comprises one of a reversible and an irreversible overcurrent fuse.

13. The cell of claim 11, wherein said first state of said switch is an open circuit and said second state is a closed circuit.

14. The cell of claim 11, wherein said first state of said switch is a closed circuit and said second state is an open circuit.

15. The cell of claim 11, wherein said first state of said switch is a closed circuit and said second state is an open circuit and wherein said second state interrupts a connection of said cell with a charging device.

16. The cell of claim 11, wherein said first state of said switch is a closed circuit and said second state is an open circuit and wherein said second state interrupts a connection of said cell with a consumer circuit.

17. The cell of claim 11, wherein said first state of said switch is an open circuit and said second state is a closed circuit and wherein said second state short circuits a charging device connected to said cell.

18. The cell of claim 11, wherein said first state of said switch is an open circuit and said second state is a closed circuit and wherein said second state short circuits said cell.

19. The cell of claim 11, wherein said secondary state of said switch is reversible.

20. The cell of claim 11, wherein said detector is enclosed within said housing.

21. The cell of claim 11, wherein said electrodes are located on opposite sides of an electrical insulator which allows ion migration between the electrodes, and wherein each of the electrodes is connected to an inner surface of an electrically conductive section of the hermetically sealed housing by an electrically conductive tap.

22. A secondary electrochemical cell for an implantable medical device, said cell comprising:
a hermetically sealed housing comprising a biocompatible material suitable for implantation;
a positive electrode in said housing;
a negative electrode in said housing;
said positive electrode and said negative electrode each comprising an active material and both being directly, without the use of any further housing, accommodated entirely within said hermetically sealed housing;
a detector at least operatively connected to said housing, wherein said detector is constructed and arranged to sense a predetermined operating state of said cell; and
a switch that is responsive to said detector sensing said predetermined operating state to switch from a first state to a second state, wherein said switch in said second state prevents at least one of a recharging operation and a discharging operation.

23. The cell of claim 22, wherein said electrodes are located on opposite sides of an electrical insulator which allows ion migration between the electrodes, and wherein each of the electrodes is connected to an inner surface of an electrically conductive section of the hermetically sealed housing by an electrically conductive tap.

24. The cell of claim 22, wherein said first state of said switch is an open circuit and said second state is a closed circuit.

25. The cell of claim 22, wherein said first state of said switch is a closed circuit and said second state is an open circuit.

26. The cell of claim 22, wherein said first state of said switch is a closed circuit and said second state is an open circuit and wherein said second state interrupts a connection of said cell with a charging device.

27. The cell of claim 22, wherein said first state of said switch is a closed circuit and said second state is an open circuit and wherein said second state interrupts a connection of said cell with a consumer circuit.

28. The cell of claim 22, wherein said first state of said switch is an open circuit and said second state is a closed circuit and wherein said second state short circuits a charging device connected to said cell.

29. The cell of claim 22, wherein said first state of said switch is an open circuit and said second state is a closed circuit and wherein said second state short circuits said cell.

30. The cell of claim 22, wherein said secondary state of said switch is reversible.

31. The cell of claim 22, wherein said detector is enclosed within said housing.

* * * * *

UNITED STATES PATENT AND TRADEMARK OFFICE
CERTIFICATE OF CORRECTION

PATENT NO. : 7,232,625 B2  Page 1 of 1
APPLICATION NO. : 10/101193
DATED : June 19, 2007
INVENTOR(S) : Hans Leysieffer et al.

It is certified that error appears in the above-identified patent and that said Letters Patent is hereby corrected as shown below:

In the Specification:

At column 7, line 54 reads "No. 6,192,272) which has not been published." and should be amended to --No. 6,192,272) ~~which has not been published.~~--

At column 8, lines 37 and 38 read "responding to co-assigned U.S. Pat. No. 6,269,266) which has not been published. Materials for the biocompatible" and should be amended to --responding to co-assigned U.S. Pat. No. 6,269,266) ~~which has not been published.~~ Materials for the biocompatible--.

Signed and Sealed this

First Day of July, 2008

JON W. DUDAS
*Director of the United States Patent and Trademark Office*